US006966455B2

(12) United States Patent
Skavnak

(10) Patent No.: US 6,966,455 B2
(45) Date of Patent: Nov. 22, 2005

(54) APPARATUS AND METHOD FOR VENDING PRODUCTS HAVING VARIOUS DIMENSIONS

(75) Inventor: James E. Skavnak, Minneapolis, MN (US)

(73) Assignee: Gross-Given Manufacturing Company, St. Paul, MN (US)

(*) Notice: Subject to any disclaimer, the term of this patent is extended or adjusted under 35 U.S.C. 154(b) by 180 days.

(21) Appl. No.: 10/613,165

(22) Filed: Jul. 3, 2003

(65) Prior Publication Data

US 2004/0056042 A1 Mar. 25, 2004

Related U.S. Application Data

(60) Provisional application No. 60/394,223, filed on Jul. 5, 2002.

(51) Int. Cl.[7] .............................................. B65G 59/00
(52) U.S. Cl. ...................................... 221/251; 221/301
(58) Field of Search ............................... 221/301, 295, 221/289, 125, 251, 298

(56) References Cited

U.S. PATENT DOCUMENTS 3,837,528 A * 9/1974 Rakucewicz ................ 221/114
3,991,907 A 11/1976 Kull
4,483,459 A 11/1984 Taylor et al.
4,779,760 A * 10/1988 Wittern et al. .............. 221/283
5,385,265 A 1/1995 Schlamp
5,799,823 A * 9/1998 Feltrin ........................ 221/298
6,068,142 A 5/2000 Primiano
6,230,930 B1 * 5/2001 Sorensen et al. ........... 221/131
6,237,784 B1 5/2001 Primiano
6,286,715 B1 9/2001 Ziesel et al.
6,328,180 B1 12/2001 Sorensen et al.
6,513,677 B1 2/2003 Sorensen et al.
2001/0000609 A1 5/2001 Rudick et al.

FOREIGN PATENT DOCUMENTS

WO WO 94/25941 11/1994

* cited by examiner

*Primary Examiner*—Kenneth Noland
(74) *Attorney, Agent, or Firm*—Merchant & Gould P.C.

(57) ABSTRACT

An improved method and apparatus for vending products, and particularly beverage containers, of varied sizes, shapes and configurations are disclosed. The products to be vended are aligned in selectable ordered queues within a vending machine that can include a transparent front panel. A container release assembly is positioned at the end of the vend queue to vend a container upon activation. The container release assembly acts on the first-in-line container to be vended and on the second-in-line container, by retaining the second-in-line container while the first is being released. The container release assembly acts on the containers from two opposite sides of the containers.

14 Claims, 21 Drawing Sheets

APPARATUS AND METHOD FOR VENDING PRODUCTS HAVING VARIOUS DIMENSIONS

Priority under 35 U.S.C. §119(e) is claimed to provisional application Ser. No. 60/394,223, filed on Jul. 5, 2002, and entitled "Apparatus and Method for Vending Products Having Various Dimensions". The complete disclosure of application 60/394,223 is incorporated by reference herein.

FIELD OF THE INVENTION

This invention relates generally to vending machines, and more particularly, to a method and apparatus for vending various sized products such as bottled or canned beverages of varied sizes and shapes.

BACKGROUND OF THE INVENTION

This invention applies to the vending of products in general and in particular to the difficulties that arise when attempting to dispense different sized or shaped items. Additionally, this invention applies to the vending of fragile items that do not fare well when subjected to dropping or impact forces encountered during a vend cycle. While the invention addresses all of these issues, the problems best characterized by the situation are associated with dispensing bottled beverages of various sizes and configurations and packaged in various types of materials such as glass or plastic. Accordingly, the invention will hereinafter be discussed in the context of its applicability to dispensing contained beverages, it being understood that the inventive principles can be expanded to include the dispensing of other products as well.

Machines for vending canned and/or bottled beverages have long been known. Early bottled vending machines enabled release of same-sized bottled beverages, one at a time, following deposit of the required purchase amount, from chest-like coolers. The purchaser was required, for example, to slide the neck of the beverage bottle along and through a retaining race to a dispensing location from which it could be lifted out of the refrigerated chest after release by the dispensing mechanism. With the advent of canned beverages, dispensing became somewhat simpler and easier to automate due to the standardization of container sizes and techniques that enabled the cylindrical cans to roll and drop through chutes during a vend cycle to the delivery area of the machine. Due in part to the rigidity of the cans and their secure seal mechanisms, and the fact that their movement can be fairly well controlled during a dispensing cycle, the canned beverage vending machine has become the standard of today's sealed beverage dispensing systems.

For the most part, the sale of specialty beverages such as fruit or fruit flavored juices, milk, teas and the like and/or beverages that are sealed in glass or plastic bottles, has been conducted by over-the-counter sale techniques and not through automated vending machines. For many of such specialty beverages, packaging in the standard disposable can configuration is not a viable option. For others, the marketing appeal and distinctiveness of a uniquely shaped or stylized container is of major concern. Non-can packaging has now even become popular for the well-known carbonated beverages, that are readily available in many different sized and shaped containers, both plastic and glass, and in various volumes. There is a desire to vend these non-can, specialty beverages via an automated vending machine.

Automated vending has been a problem for most of the non-standard sized and non-canned beverage containers. To date, an automated vending machine that can reliably and safely vend beverage containers of different materials, sizes and shapes from the same vend queue of a machine, without damaging or dropping the container or product within, has not been available.

The present invention is directed to vending machines and the need for a dispensing machine and method for dispensing containers such as beverages packaged in glass, plastic or can containers of varied sizes, shapes and fluid volumes.

SUMMARY OF THE INVENTION

This invention provides an improved vending machine apparatus and method for vending products, particularly bottled and canned beverages, that have varying product dimensions, particularly varying diameter, from the vend queue. The vending machine apparatus is also suitable for vending items such as candy bars, chips, gum, and other snacks. Prepackaged items such as toiletries (toothbrush; toothpaste, etc.) could also be vended. The vending machine apparatus can vend a first product having a first dimension and a second product having a second dimension, the first dimension and the second dimension being different, from the same vend queue.

The vending machine of the present invention is extremely versatile and is particularly applicable to the vending of glass and plastic beverage items, such as containers, of varied sizes, shapes and fluid volumes which can simultaneously be housed and dispensed by a single vend queue of the vending machine; this is accomplished by a container release assembly according to the invention. By using the container release assembly, the addition of spacers or shims into the vend tray can be eliminated.

Within the vending machine, the product queues can be arranged in vertically spaced columns and the items can be arranged on shelves or trays that can be inclined at angles which permit gravity movement of the stored items in the queues toward a dispensing end of the queue. According to a preferred aspect of the invention, a customer selected item is dispensed from the selected container queue by allowing the first-in-line container to slide from the selected queue while retaining the second-in-line and successively aligned beverage containers in that queue from moving along the queue. The first-in-line container and second-in-line container can have different diameters.

The container release assembly, which retains and releases the containers as desired, acts upon the containers from two generally opposite sides of the container as the container is positioned in the queue. The release assembly includes two release apparatus, one each of the two sides of the container. Each release apparatus includes a gate, a front container engaging member and a back container engaging member. A link extends between and operably connects the two release apparatus. In a first position, the release assembly retains the first-in-line container. As the container release assembly is activated to vend the first-in-line container, the front engaging member pivots outward and away from the first-in-line container to release the container, simultaneous to the back engaging member pivoting inward to the second-in-line container to restrain the container. Preferably, the back engaging member restrains the second-in-line container prior to the release of the first-in-line container. This can be accomplished by providing a fast-acting cam system for the back engaging member.

To activate the container release assembly an external force is applied to the gate of the release apparatus, causing the gate to rotate through a cranking angle. An example range for the cranking angle is 76.5 to 99.5 degrees.

The release apparatus of the container release assembly can be adapted so that one of the release apparatus is the prime mover or actuator for the release of the container.

In a preferred embodiment, the vending machine with the inventive container release assembly includes an efficient, cost-effective, highly accurate, reliable and easily programmable robotic container capture assembly for capturing that container selected by a customer and for smoothly, gently, and quickly carrying the captured container to a product delivery area or port of the machine. The product delivery port is located at thigh to waist height to minimize customer bending while retrieving the vended product from the machine. The shelf or tray area of the machine, including the container release assembly, preferably contains no active or powered components, but is entirely passive in nature, being operated entirely in response to activation forces applied thereto by the robotic beverage container capture apparatus. The smooth vending process minimizes product damage and stress and virtually eliminates machine maintenance caused by damage to or breakage of beverage containers during a vend cycle.

Another aspect of the present invention is a method of vending containers from a vending machine. The method includes the steps of: (a) aligning a plurality of items, such as bottled beverages, in an ordered queue, the plurality including a first-in-line and a second-in-line bottled beverage; (b) providing a container release assembly having a first front stop, an opposite second front stop, a first back stop and a second opposite back stop, the first and second front stops positioned against the first-in-line bottle; (c) removing the first and second front stops from the first-in-line bottled beverage while retaining the second-in-line bottled beverage with the first and second back stops; (d) vending the first-in-line bottle; and then (e) transferring the second-in-line bottled beverage to be the first-in-line bottled beverage.

Yet another method of the invention is vending bottled beverages from a vending machine includes the steps of: (a) aligning a plurality of bottled beverages in an ordered queue of the beverages, the plurality including a first-in-line and a second-in-line bottled beverage, the first-in-line bottled beverage having a different diameter than the second-in-line bottled beverage; and (b) activating a container release assembly to vend the first-in-line bottled beverage, the step of activating including providing a stop against the second-in-line bottled beverage, releasing the first-in-line bottled beverage while retaining the second-in-line bottled beverage, and then transferring the second-in-line bottled beverage to be the first-in-line bottled beverage.

It is not necessary that the items vended from the tray or vend queue be the same shape, size, or even the same product (for example, the queue could be arranged to alternately vend beverages and candy bars); however, the cost or charge for the vended items from the same queue should be the same.

In a preferred embodiment, one use of the vending machine which incorporates the invention contemplates the use of a robotic assembly having an X-Y support frame, a shuttle moveably mounted to the support frame for movement therealong in an X-direction; a carriage assembly operatively connected to the shuttle for controlled movement therealong in a Y-direction; and a capture mechanism operatively mounted to the carriage assembly for removing and carrying the selected product from its associated ordered queue.

The container release assembly of the present invention can be applied to any vending machine where it is desirable to vend different sized articles from the same queue or tray. For example, the vending machine could passively drop the vended item, or project the vended item, from the vend tray. Additionally, although in a preferred vending machine, an element such as capture mechanism actuates the container release assembly, other activation or activating means could be used, such as a motor, gears, switches, or other mechanical or electrical components.

These and other aspects of the invention will become more apparent upon a description of a preferred embodiment of the invention. It will be appreciated that the preferred embodiment is not to be construed as limiting the invention to any particular configurations, designs, or applications that are specifically presented therein. The preferred embodiment is presented to illustrate a specific application and implementation of the broader principles of the invention and is not to be construed in a limiting manner.

BRIEF DESCRIPTION OF THE DRAWING

Referring to the Drawing where like numerals represent like parts throughout the several views.

DETAILED DESCRIPTION OF THE INVENTION

Referring to the figures there is generally illustrated therein a preferred embodiment of a vending machine that incorporates the principles of this invention. Also illustrated is a first embodiment and a second embodiment of a container release assembly for use with the vending machine. While the preferred embodiments of the invention will be described in association with their applicability to a vending machine for bottled and canned beverages, it will be understood that the broad principles of the invention are not limited to such product dispensing applications or to the specifics of the preferred embodiments disclosed. The described machine and container release assemblies represent clear examples of a dispensing system incorporating the principles of the claimed invention, but the invention is not intended to be construed in a limiting manner as a result of the preferred embodiments disclosed.

Figure 1:
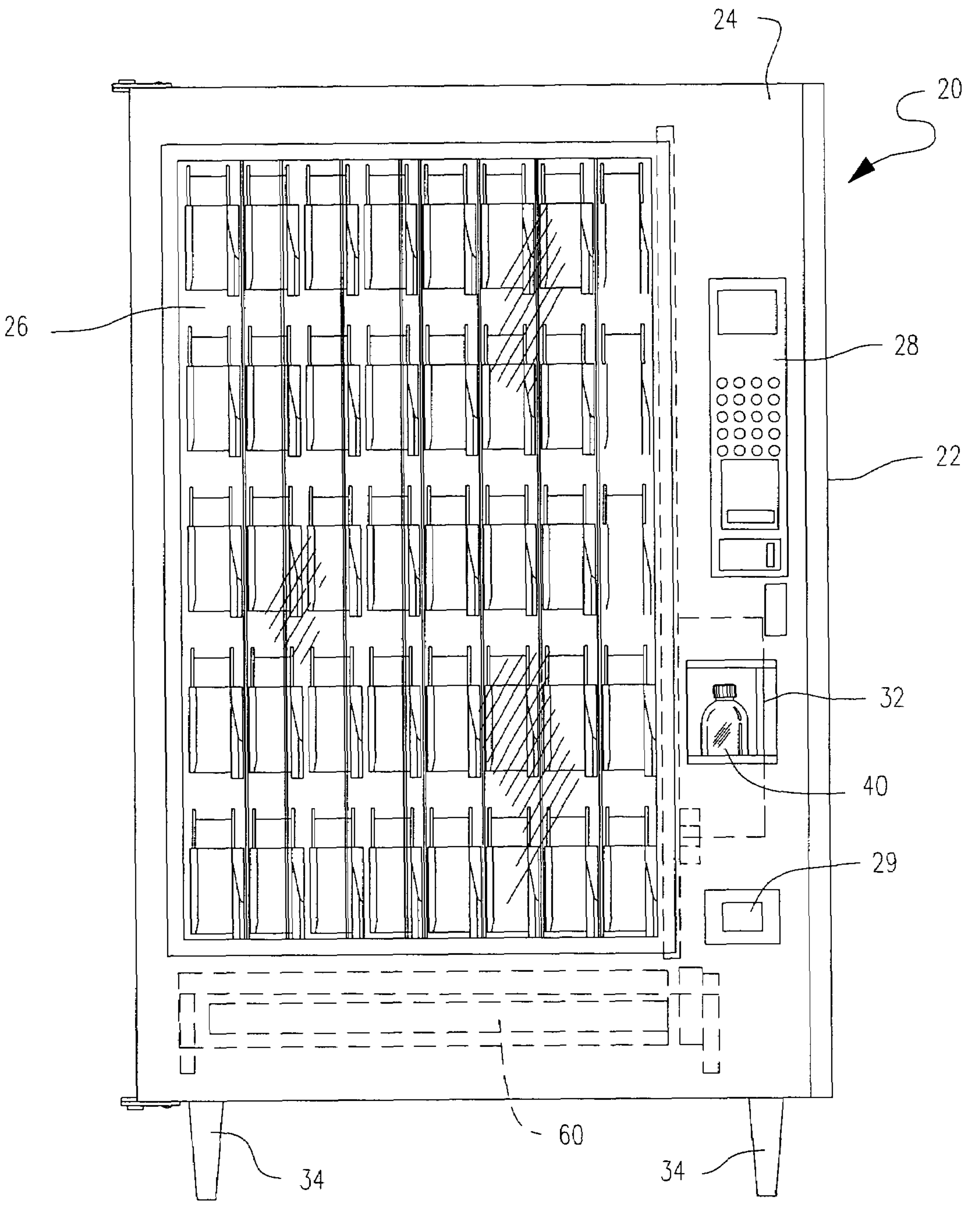
FIG. 1 is a front elevational view of a preferred embodiment of a vending machine, such as a beverage container vending machine, incorporating the principles of the invention.

Referring to the figures, specifically FIG. 1, there is generally illustrated at 20 a vending machine for dispensing bottled and canned beverages of varied shapes, sizes, configurations and fluid volumes. The vending machine generally comprises an outer chassis or cabinet 22 and a front hinged door panel 24, which in combination, define an inner cavity for housing the products to be vended, the control and refrigeration functions of the machine and other vending machine features well-known in the art. The vending machine could have multiple door panels. Front door panel 24 frames a transparent glass or clear plastic panel 26, which provides a clear view into the internal cavity of the cabinet and the products stored in ordered manner on trays therein, when door panel 24 is closed. Door panel 24 includes an appropriate control panel, generally indicated at 28, which includes a product selection input and monetary and credit processing system, well-known in the art. Since the control panel and its various features and functions do not form a part of this invention, they will not be detailed herein. Those skilled in the art will readily recognize many appropriate such control panels and features thereof that could be used in association with a vending machine as hereinafter described. Door panel 24 also includes a coin return slot, generally indicated at 29 and a locking handle assembly 30 that enables the door to be opened and closed in secured manner for purposes of maintenance, loading of the machine, and the like. Door panel 24 also includes a product delivery port, generally indicated at 32, which is approximately at thigh or waist level and depicted with its door in an "open" position in FIG. 1, with a vended bottle product 40 illustrated through the open door. A more complete description of various features of vending machine 20 will be hereinafter described and also described in U.S. Pat. Nos. 6,230,930, 6,328,180, and 6,513,677 all of which are incorporated herein by reference in their entirety.

In the preferred embodiment, the assembly of cabinet 22 and door panel 24 is supported by a plurality of legs 34 in elevated manner above a floor or support surface to enable ease of cleaning below machine 20, the ability to readily lift machine 20 by a pallet jack, fork lift or other moving type of structure, and to provide improved ventilation for a refrigeration system (not illustrated, but well-known to those skilled in the art) for vending machine 20. Additional features of cabinet 22 and vending machine 20 are described in U.S. Pat. Nos. 6,230,930, 6,328,180, and 6,513,677.

Figure 2:
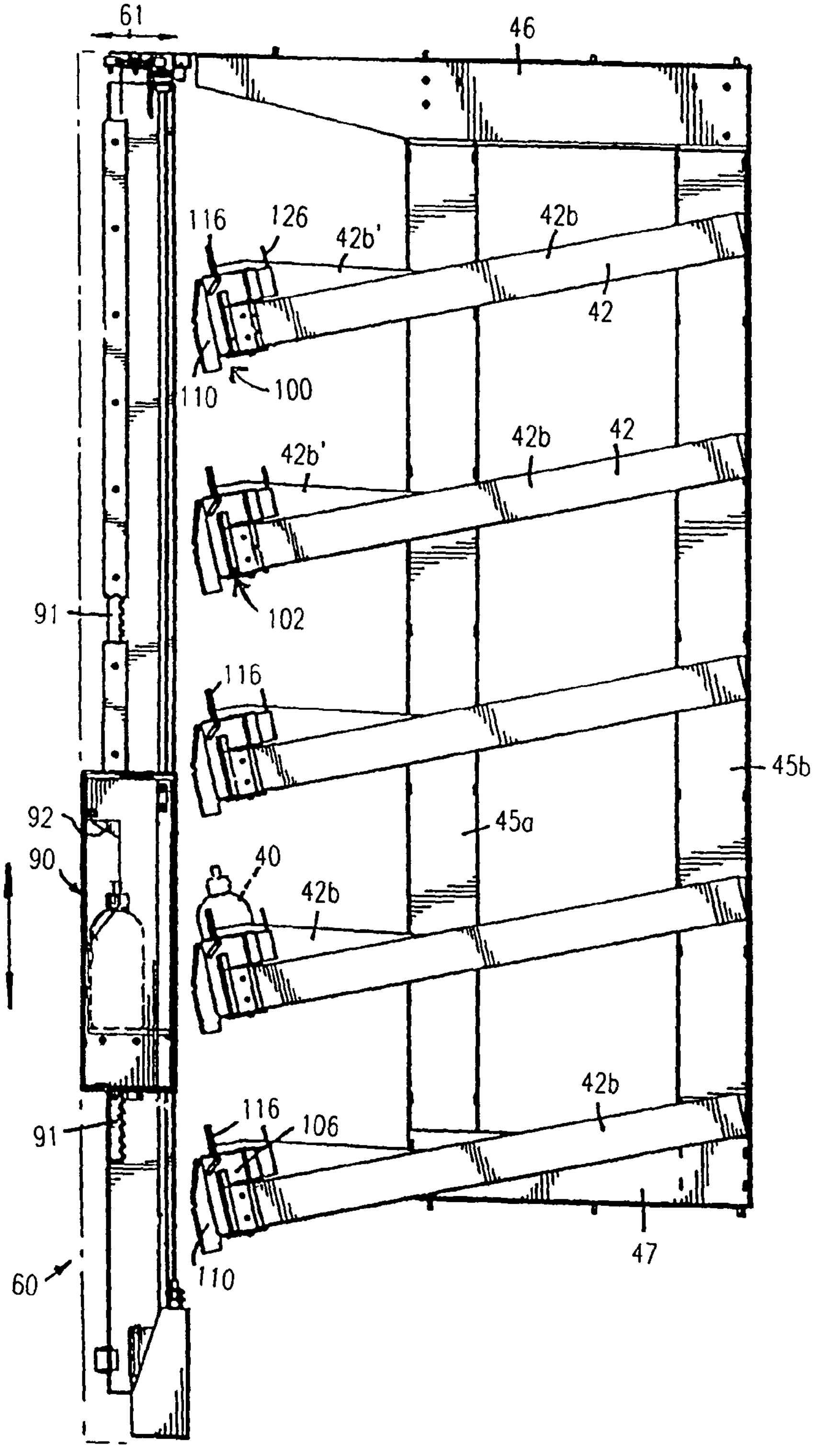
FIG. 2 is a right side elevational view of a tray assembly of the vending machine of FIG. 1.

The beverage containers housed in the internal cavity of vending machine 20 are supported by a plurality of beverage trays, two of which are generally indicated at 42 in FIG. 2. While the preferred embodiment uses "trays", it will be appreciated that the principles of the invention could also be applied to conventional beverage holding shelf configurations having partitions for separating the containers into ordered rows or aligned queues of beverages extending from front to back in the internal cavity.

In the preferred embodiment, beverage trays 42 are mounted to a plurality of vertically oriented tray mounting standards. The tray mounting standard has a pair of vertically oriented and laterally spaced (from front to back) rib members **45*a* and 45*b* respectively. The rib support members 45*a* and 45*b* are integrally formed with upper and lower support brace portions 46 and 47, respectively, that extend in generally horizontal manner in the direction from front to back of machine 20. Other support braces and members can be used to support trays 42, however these form no part of the invention herein. Since support members 45*a*, 45*b* and support brace portions 46, 47** and their various features and functions do not form a part of this invention, they will not be detailed herein. Those skilled in the art will readily recognize many appropriate such support features thereof that could be used in association with a vending machine as hereinafter described.

Preferably, tray 42 will be inclined at a downwardly depending angle from back to front of vending machine 20 to enable beverage containers carried thereby to slide by gravity toward the open front (i.e., dispensing) end of the tray. In the preferred embodiment, the preferred angle of inclination of the tray with the horizontal is from about 8–20 degrees and most preferably about 12 degrees. The degree of inclination is a design parameter that can be varied, depending upon the type, size, weight, configuration, etc. of the container being held, the relative coefficient of friction between the container and the tray floor surface, the type of materials used to construct the tray, the temperature of the internal cavity, etc. It will also be appreciated that the principles of this invention do not require movement of the products toward the dispensing end of their respective trays or shelves to be accomplished entirely by gravity. Other biasing assist techniques well known in the art could also be employed.

Figure 3:
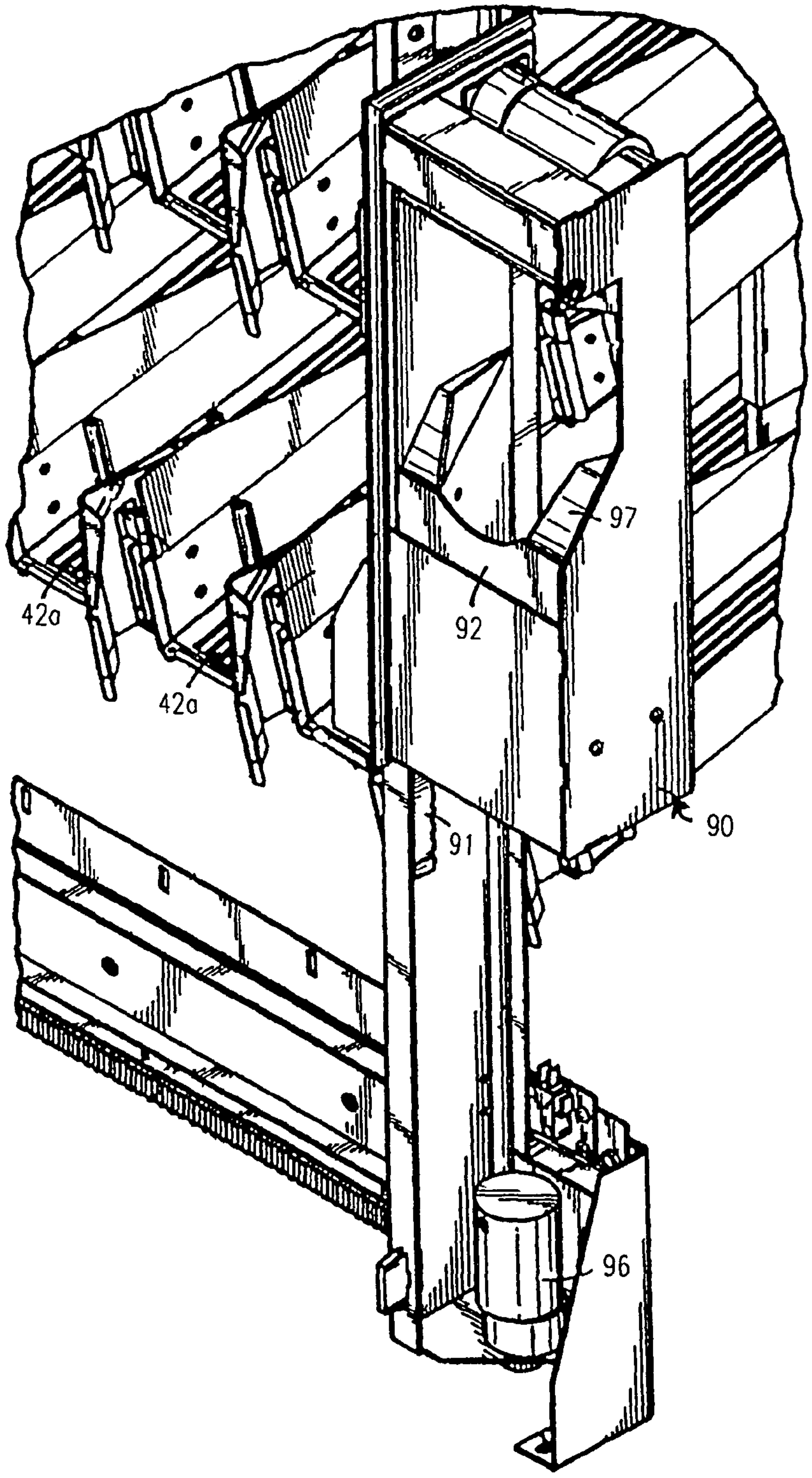
FIG. 3 is an enlarged fractional perspective view of a portion of a robotic container capture assembly of the vending machine of FIGS. 1 and 2.

In the preferred embodiment, each of trays 42 is shaped in the configuration of a U-shaped channel, generally having a lower surface or floor support surface 42*a* and a pair of oppositely disposed side walls 42*b* upwardly extending from floor 42*a* at right angles with respect thereto; see FIGS. 2 and 3. In the preferred embodiment, the sidewalls are spaced so as to accommodate beverage containers of up to 3 inches in diameter; however, it will be recognized that the invention is not limited by such dimension or to other non-claimed dimensions described herein. Floor 42*a* is designed to minimize sliding friction therealong.

In the preferred embodiment, each of trays 42 is designed to hold a collective beverage container weight of up to about 15–25 pounds, usually about 16–20 pounds. It will be appreciated that other tray or product support configurations such as, for example, wire grid trays, could be used.

Beverage containers carried by the plurality of open-faced trays 42 are removed from the trays and transported to product delivery port 32 (FIG. 1) by a robotic container capture and transport assembly, generally indicated at 60 in FIG. 2. The robotic assembly 60 operates within vend selection space 61 which is generally that space or volume between the inner surface of the door 24 and the front surfaces of the front frame members that hold trays 42. Assembly 60, in general includes a carrier frame 90, a gear rack 91, various capture assembly 92.

The robotic system will be described with reference to an X, Y, Z coordinate system in the machine, the X-direction being horizontal and parallel to the floor, the Y-direction being the vertical direction and perpendicular to the X-direction and the Z-direction being orthogonal to the XY plane and, relative to the vending machine, is in the direction from the front to back of the machine. The robotic container capture and transport assembly 60 generally includes a pair of horizontally mounted rail/rack assemblies, a vertically oriented shuttle bar that rides along the horizontal rails in the X-direction, a carrier frame that moves in the Y-(vertical) direction along the shuttle bar, and a pick-up or transfer mechanism that is mounted to and moves with the carrier frame and operates in the Z-direction to remove a beverage container from a selected tray.

Movement of the transport assembly 60 is controlled by an X-drive motor that is mounted in vertical manner. The motor can be a reversible dc brush gear motor with a dynamic brake that enables the motor drive gear to stop immediately when the power to the motor is discontinued, enabling accurate positioning of the transport assembly in the X-direction. A suitable motor is a 24 volt dc motor manufactured by Barber Colman, model LYME 63000-731 rated at 5.3 inch-pounds of torque at 151 rpm, whose output shaft is connected to a drive gear. The X-drive motor controls movement of transport assembly 60 and attached components in the X-direction.

A Y-drive motor is horizontally mounted to the carrier frame 90 near its upper end, in a manner such that its drive gear cooperatively, matingly engages the vertical gear rack 91. Y-drive motor 96 is a reversible dc brush gear motor that is driven by a pulse width modulated (PWM) signal. In the preferred embodiment, motor 96 is a 24 volt dc motor manufactured by Barber Colman, model LYME 63070-X-9332.

The carrier frame assembly 90 supports a container capture assembly 92 that can assume various configurations. For example, the container capture assembly may be configured as a robotic arm that grasps and lifts the selected beverage container into the carriage frame assembly. However, in the preferred embodiment, the container capture assembly comprises a simple pivotal assembly that rotates generally in the Z-axis direction to release and capture a beverage container from a customer selected tray 42. Referring to FIG. 3, the container capture assembly 92 is pivotally mounted to the carrier frame assembly 90. As indicated in FIG. 3, the container capture assembly 92 cooperatively fits and moves into nesting position within the outer shell of the carrier frame assembly 90. A Z-drive reversible dc brush gear motor with a dynamic brake is mounted to the bottom of the container capture assembly 92. In the preferred embodiment the motor is a 24 volt dc motor manufactured by Barber Colman, model JYHE-63200-741 rated at 3.5 inch pounds of torque at 46.6 rpm. Both the carrier frame assembly 90 and the container capture assembly 92 have open back surfaces. The container capture assembly 92 further includes a pair of tapered beverage container guide members 97 connected to its opposed side walls and tapered in a manner so as to converge toward the front face of the container capture assembly 92 for assisting in centering and supporting the outer surface of a beverage container carried by the container capture assembly 92, as will be appreciated more upon further description of the invention.

The previous description of the beverage trays 42 describes a simple, unembellished U-shaped open end beverage delivery tray configuration. In the preferred embodiment, the delivery end portion of the tray has been modified to achieve the vending purposes of this invention. Referring to FIG. 2, it will be noted that those portions of the tray side walls 42*b* located adjacent the open dispensing end of the trays have been raised or increased in height by extension portions, generally indicated at 42*b*'. Extension portions 42*b*' are shown as generally triangular, but may be of any configuration or dimension. The added height provides for extra stability of the beverage container at the tray's outlet end, to minimize sideways or lateral tipping of the beverage container during the dispensing operation. Extension portions 42*b*' may be permanently attached or may be removable and replaceable as needed.

Additional features of the various elements such as carrier frame assembly 90, container capture assembly 92, the various drive motors, are described in U.S. Pat. Nos. 6,230,930, 6,328,180, and 6,513,677, which are incorporated by reference.

The beverage containers carried by tray 42 are held within the tray and are either prevented or allowed to exit from the open end of the tray by a container release apparatus. In the preferred embodiment, the container release apparatus is entirely "passive" in nature (i.e. does not require any electrical or other energy powered mechanism residing on the trays, for its operation). A first embodiment of the container release assembly of the present invention is described with reference to FIGS. 4 through 15 and a second embodiment with reference to FIGS. 16 through 21.

Figure 4:
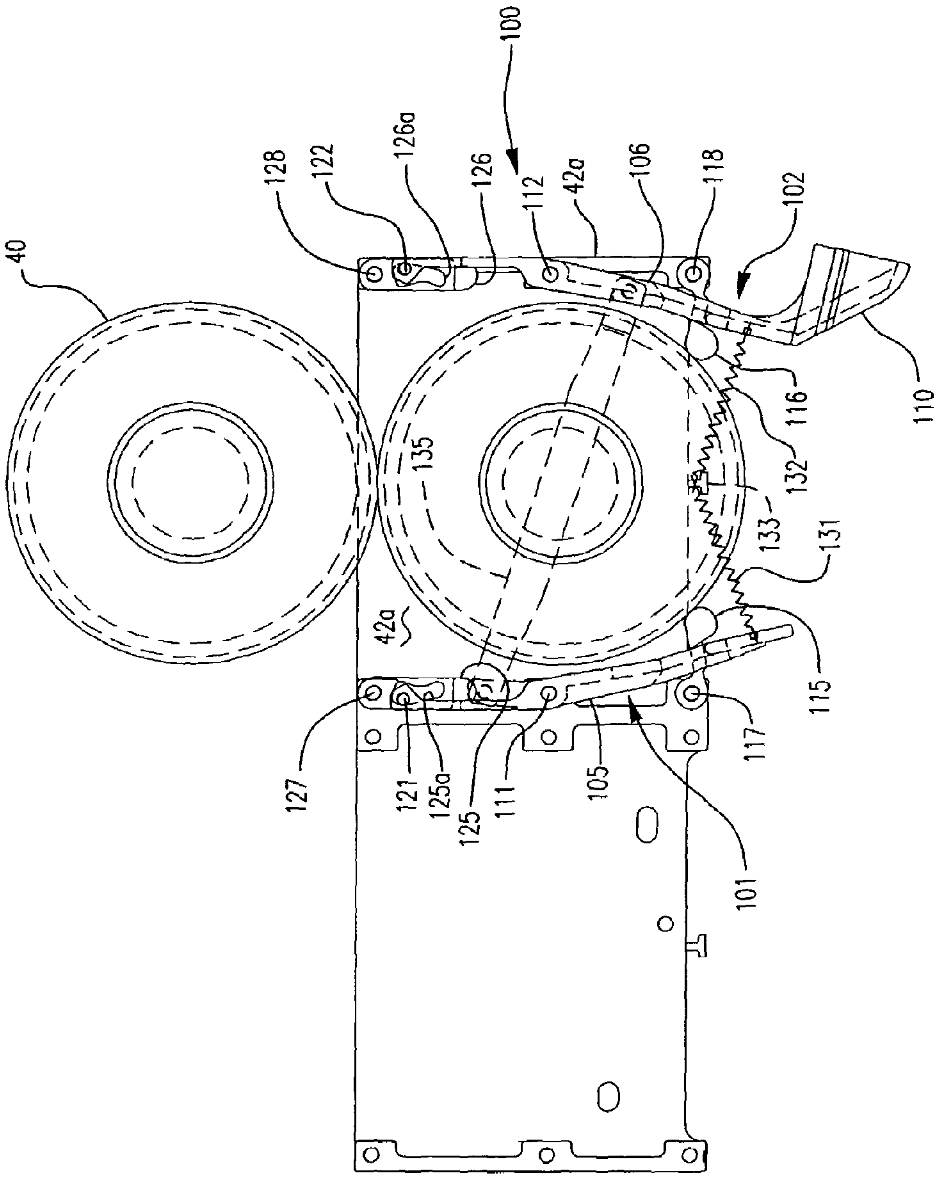
FIG. 4 is a top view of a first embodiment of a container release assembly according to the present invention and of the vending machine of FIG. 1, the container release assembly illustrated in a first position retaining a first beverage bottle and with a second beverage bottle in a vend queue.

Referring thereto, particularly to FIG. 4, a first container release assembly of the present invention is generally illustrated at 100. Container release assembly 100 includes a first container release apparatus 101 and a second container release apparatus 102. When viewed from the point of view of the vending machine customer, first container release apparatus 101 is on the left side of the vend queue and second container release apparatus 102 is on the right side of the vend queue. Apparatus 101 and apparatus 102 are positioned so that the two are on opposite sides of the beverage container to be vended. Thus, assembly 100 acts upon the beverage container from two, generally opposite sides.

Each of apparatus 101, 102 includes a gate 105, 106, a front container stop or engaging member 115, 116, and a back container stop or engaging member 125, 126. Connected to each gate 105, 106 is a spring 131, 132; springs 131, 132 meet and are anchored at junction 133. Springs 131, 132 are generally positioned below tray floor 42*a*; in some embodiments, springs 131, 132 extend from gates 105, 106 to a portion of floor 42*a*. Gate 106 includes a foremost portion 110, which will be described below. A link 135, positioned below floor 42*a*, extends between and operably connects the two release apparatus 101, 102; specifically, link 135 connects gate 105 to gate 106 and provides symmetrical but rotationally opposite movement between gate 105 and gate 106.

Each gate 105, 106 is pivotally connected to a sidewall 42*b* of a tray (as viewed from the open front delivery end of a tray) by a center hinge pin 111, 112, respectively. Gates 105, 106 include open slots 107, 108, respectively, formed therethrough (see FIG. 15). Slots 107, 108 are "open" slots in that the lower edge of the slot is open; it is understood that a closed slot would also be suitable. A portion of front engaging member 115, 116 extends through slot 107, 108 and is pivotally connected to sidewall 42*b* by a hinge pin 117, 118. Back engaging member 125, 126 is also pivotally connected to sidewall 42*b*, such as by a hinge pin 127, 128. Back engaging member 125, 126 includes a slot 125*a*, 126*a* therein through which passes a pin 121, 122 that is part of gate 105, 106.

In the "home" position, gates 105, 106 are configured with the front-most portion, that is, the portion forward of hinge 111, 112 where front engaging member 115, 116 is present, positioned closer to the center of tray 42 than hinge 111, 112. The back-most portion of gate 105, 106, that is, the portion back of hinge 111, 112 where back engaging member 125, 126 is present, is positioned farther from the center of tray 42 than hinge 111, 112. As container release assembly 100 is activated, gates 105, 106 pivot about hinges 111, 112, causing the front-most portion of gates 105, 106 to move outward toward sidewall 42*b* and the back-most portion of gates 105, 106 to move inward toward the center of tray 42. Springs 131, 132 urge gate 105, 106 to return to the home position.

The foremost portion of gate 105, 106 is bent at an angle to the general plane of gate 105, 106 to form a pair of forward cam surfaces. These angled cam surfaces provide an area for engagement with front engaging member 115, 116. Gate 106 also includes foremost portion 110 which provides a "target" area for engagement by movement of an activating means, such as the container capture assembly 92, as hereinafter described. The lowermost portion of the cam surfaces extends slightly below floor 42*a* of tray 42. In a preferred embodiment, these cam surfaces of gates 105, 106 that extend below the floor 42*a* of the tray include features, such as ribs, that can improve the structural integrity of gates 105, 106.

As stated, gates 105, 106 are pivotal about hinges 111, 112; the front portion of gate 105, 106 pivots toward the center or open portion of tray 42 with which it is associated (i.e., away from the sidewall 42*b*). Gate 105, 106 retainably holds front engaging member 115, 116, which is oriented generally vertically and generally perpendicular to floor 42*a* and generally parallel to sidewalls 42*b* of tray 42. The height of engaging member 115, 116 can vary to accommodate different heights of beverage or other containers. The purpose of container engaging member 115, 116, as will become clear upon a more detailed description, is to engage a container in tray 42 and prevent its sliding movement along tray 42 in the direction toward its dispensing end.

That portion of gate 105, 106 located forward of hinge pin 111, 112 also includes slot passageway 107, 108 (see FIG. 15) formed therethrough for slidably accommodating front engaging member 115, 116 that is pivotally mounted in relation to sidewall 42*b* for movement about hinge 117, 118. Back engaging member 125, 126 includes a vertical slot or receptacle 125*a*, 126*a* therein that forms cammed guides or races which pivotally retains pin 121, 122; pin 121, 122 is fixed to gate 105, 106. Similar to front engaging member 115, 116, back engaging member 125, 126 blocks movement of a beverage container (the second-in-line container) along floor 42*a* of tray 42. Back engaging member 125, 126 can be any suitable height.

The connection of back engaging member 125, 126 with gate 105, 106 is such that a fast-acting cam is provided; the "fast-acting" being faster than that at front engaging member 115, 116. Such fast action allows back engaging member 125, 126 to restrain the second-in-line container prior to the release of the first-in-line container by front engaging member 115, 116. Slot 125*a*, 126*a* in engaging member 125, 126 is strategically positioned and shaped relative to hinge pin 127, 128 such that when gate 105, 106 is pivoted about hinge 111, 112, back engaging member 125, 126 pivots toward the center of tray 42 faster and farther than front engaging member 115, 116 pivots out toward sidewall 42*b*. Such fast-action camming can be accomplished by shaping slot 125*a*, 126*a* as a bifurcated, yet continuous, slot. One example of a suitable slot 125*a*, 126*a* is a kidney shaped slot. Other examples of suitable slots include non-linear, angled slots or radiused slots.

The movements of gate 105, 106 and engaging members 115, 116, 125, 126 follow a prescribed function. The movement of first release apparatus 101 (which includes gate 105, front engaging member 115 and back engaging member 125) is generally symmetrical but rotationally opposite to the movement of second release apparatus 102 (which includes gate 106, front engaging member 116 and back engaging member 126). The movement or motion of gates 105, 106 can generally be described in terms of a cranking angle. Suitable cranking angles include 76.5 to 99.5 degrees.

The movement of container release assembly 100 will now be described referring to FIGS. 4 through 11, which illustrate a top view of assembly 100 as it progress though various positions; FIGS. 12 through 15 illustrate assembly 100 in a perspective fashion. It is understood that the embodiment described is merely illustrative and variations in degrees, dimensions, and the like are contemplated. The dimensions provided below are tailored for a typical 20 fluid ounce beverage container that has a diameter of about 3 inches. It is understood that when larger or smaller containers are vended, the spacing of gates 105, 106 may be modified. Additionally or alternately the entire assembly 100 could be scaled.

Figure 5:
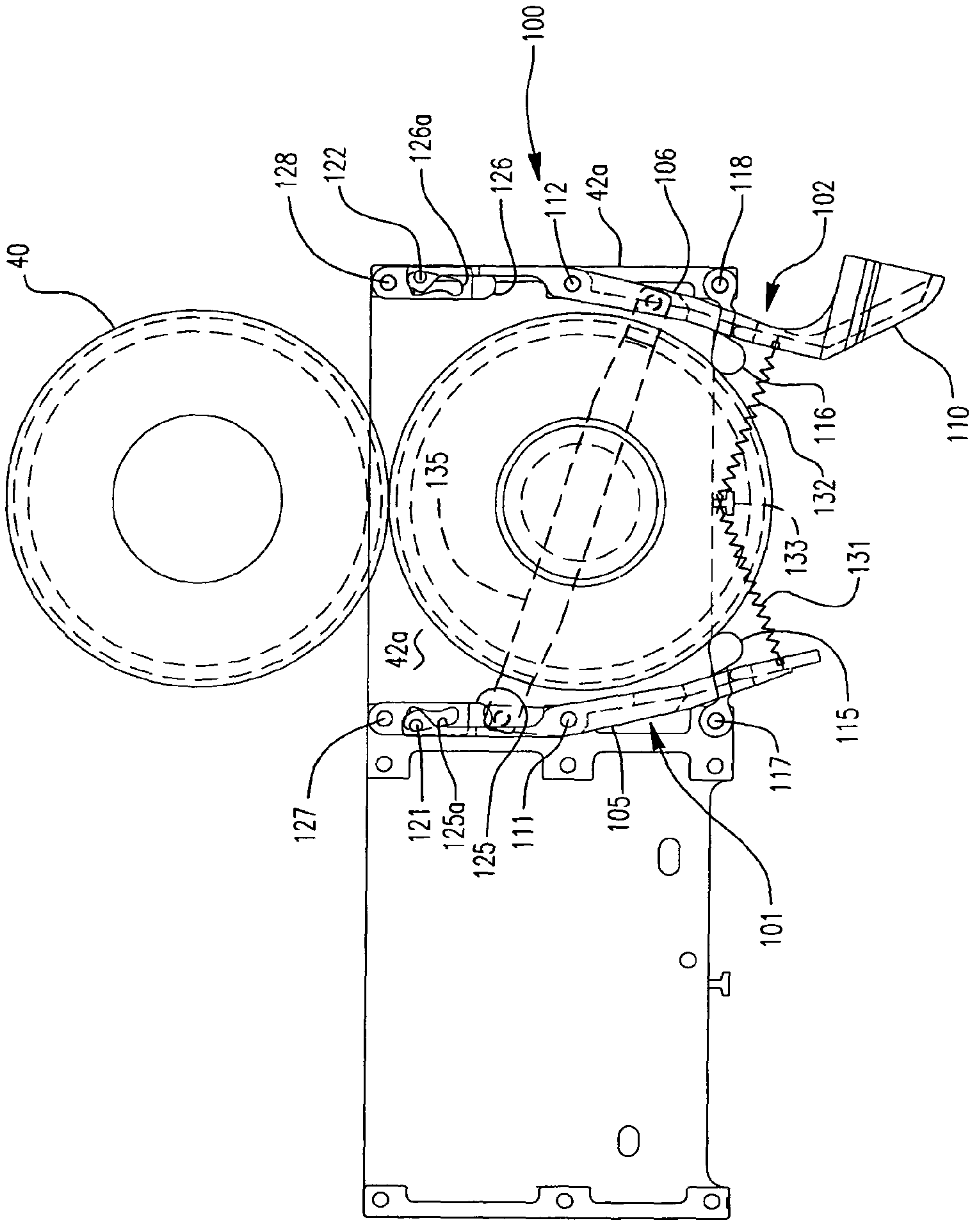
FIG. 5 is a top view of the container release assembly of FIG. 4 in the position of FIG. 4, the container release assembly in a first, "home" position.
Figure 6:
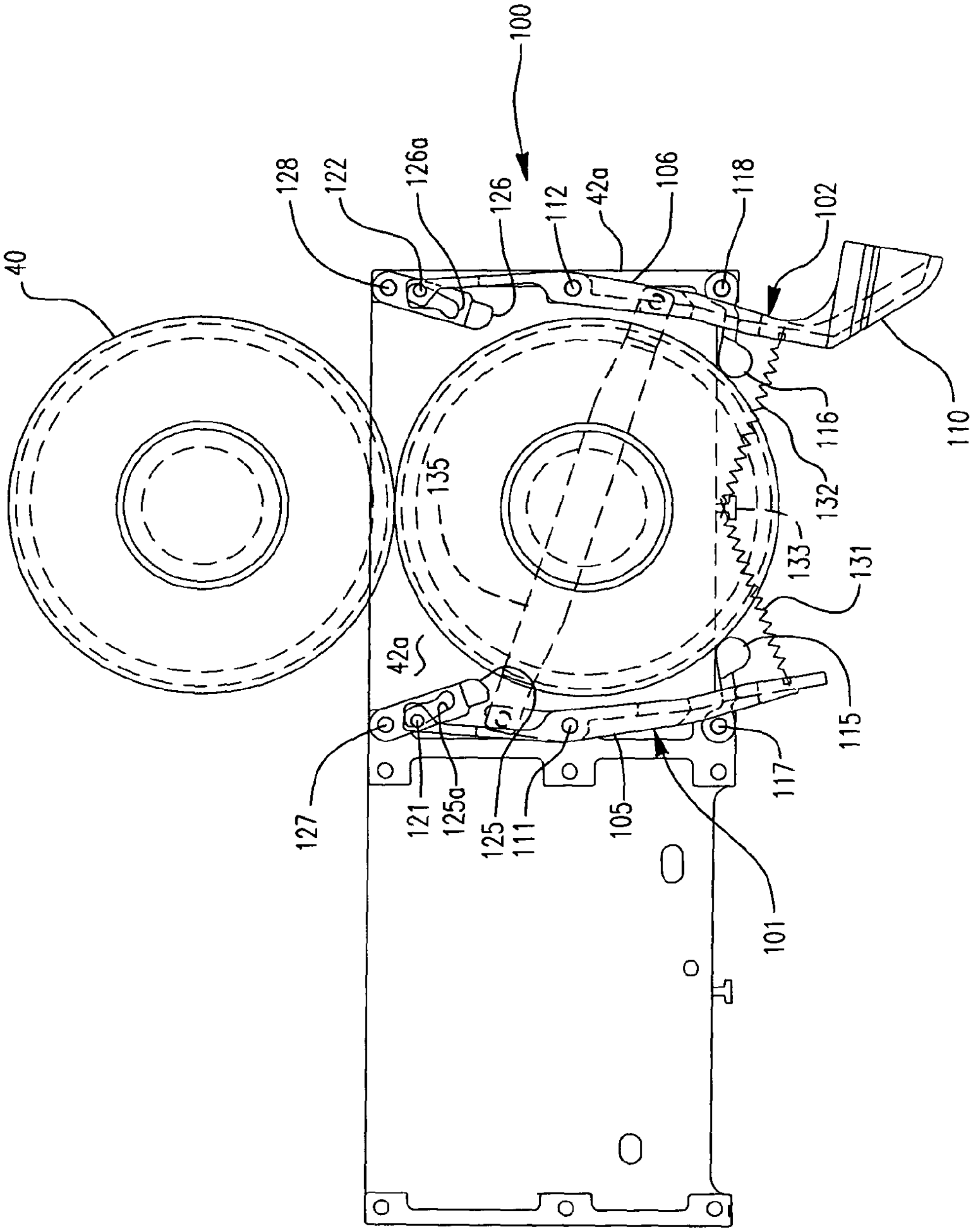
FIG. 6 is a top view of the container release assembly of FIG. 5, illustrating the container release assembly in a second position partially retaining the first beverage bottle.

In FIGS. 4 and 5, container release assembly 100 is in a first, "home" position, with gate 105, 106 forming an angle of 76.5 degrees with respect to a line perpendicular to tray 42 and the vend queue. Front engaging members 115, 116 are slightly offset from perpendicular to gate 105, 106. At this angle of 76.5 degrees, front engaging members 115, 116 have a distance of 2.020 inches therebetween, which is sufficient to retain container 40 on tray 42. Back engaging members 125, 126 have a distance of 3.135 inches therebetween.

As foremost portion 110 is activated and urged to the right (shown in FIG. 5), the front-most portion of gate 106 pivots counterclockwise. Being connected via link 135, the front-most portion of gate 105 pivots clockwise. During these first several degrees of rotation, e.g., 76.5 degrees to about 81.0 or 82.0 degrees, the distance between the front-most portion of gate 105 and the front-most portion of gate 106 increases, and front engaging member 115, 116 slides farther from perpendicular with gate 105, 106. (See FIG. 6). A feature such as a free space or a slot in can be present in engaging member 115, 116 to prevent premature advance of back engaging members 125, 126.

Figure 7:
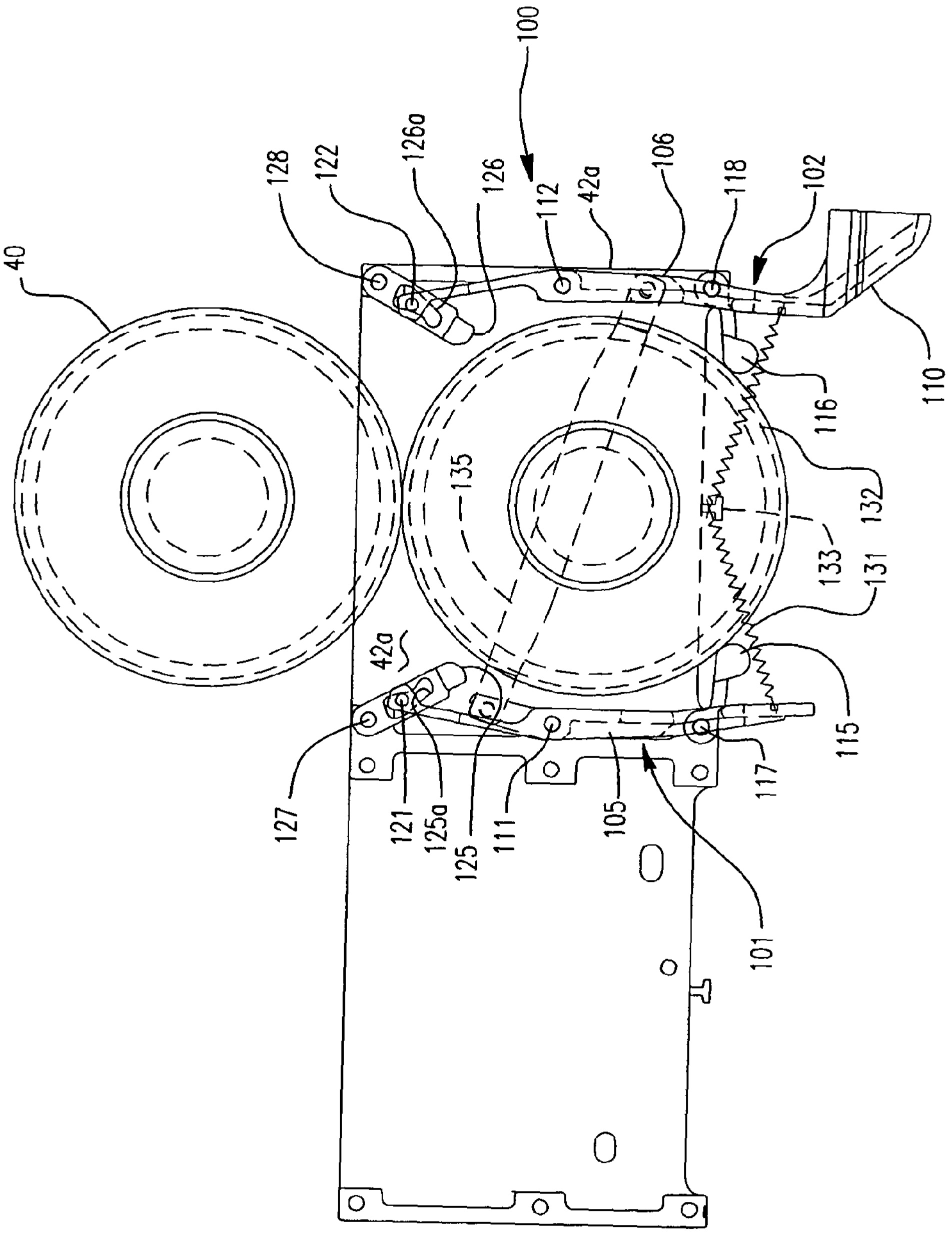
FIG. 7 is a top view of the container release assembly of FIG. 5, illustrating the container release assembly in a third position less partially retaining the first beverage bottle than in the second position.
Figure 8:
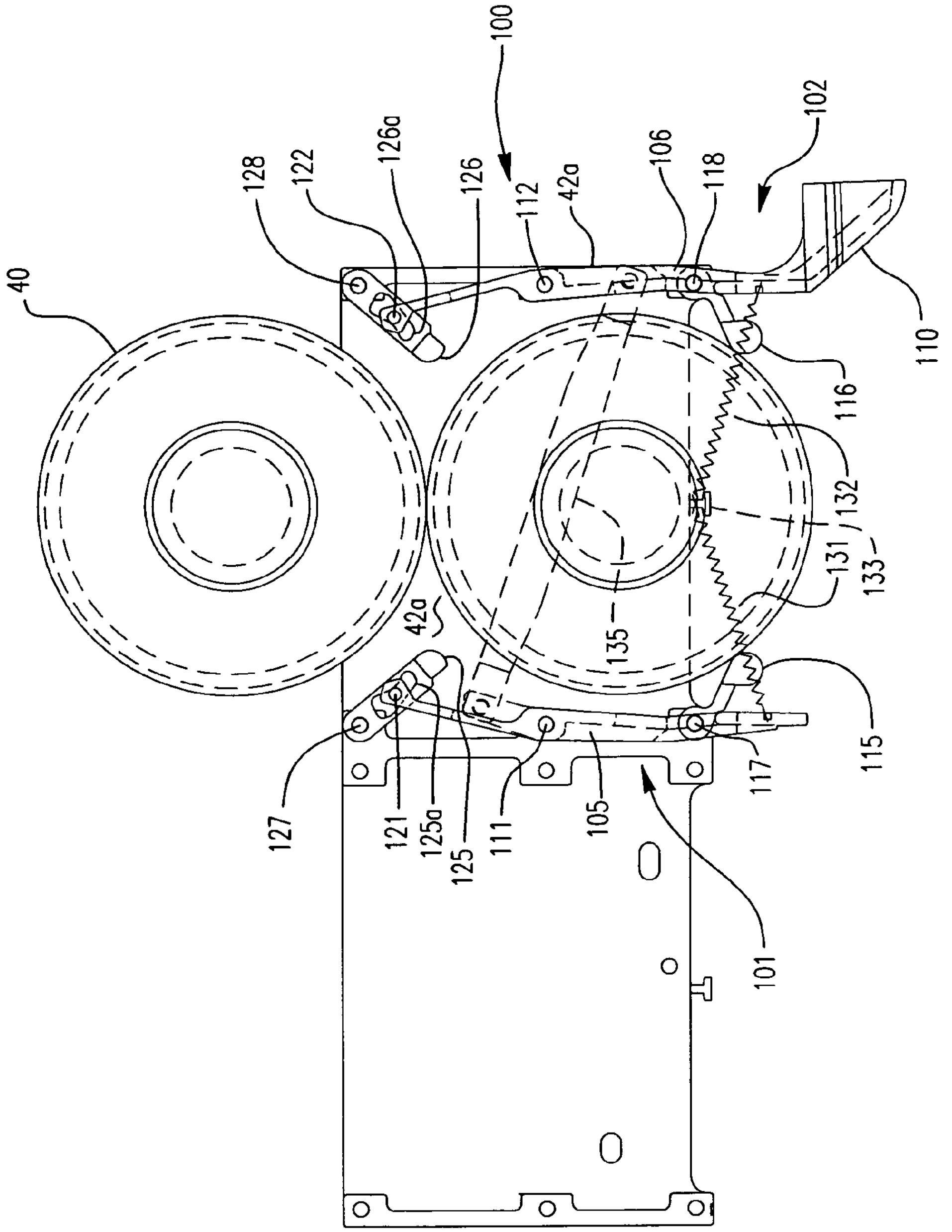
FIG. 8 is a top view of the container release assembly of FIG. 5, illustrating the container release assembly in a fourth position less partially retaining the first beverage bottle than in the third position.

For the next interval of rotation of gate 105, 106, that is, through degrees of about 81.0 or 82.0 to about 88.0, front engaging members 115, 116 collapse, allowing the first-in-line beverage container to move forward. See FIG. 7. The bottle path width is maximized by gates 105, 106, which are essentially parallel to sidewall 42*b*. At 88.0 degrees of rotation, as seen in FIG. 7, front engaging members 115, 116 have a distance of 2.111 inches therebetween, which is still sufficient to retain the bottle. Back engaging members 125, 126 have a distance of 2.396 inches therebetween.

Figure 9:
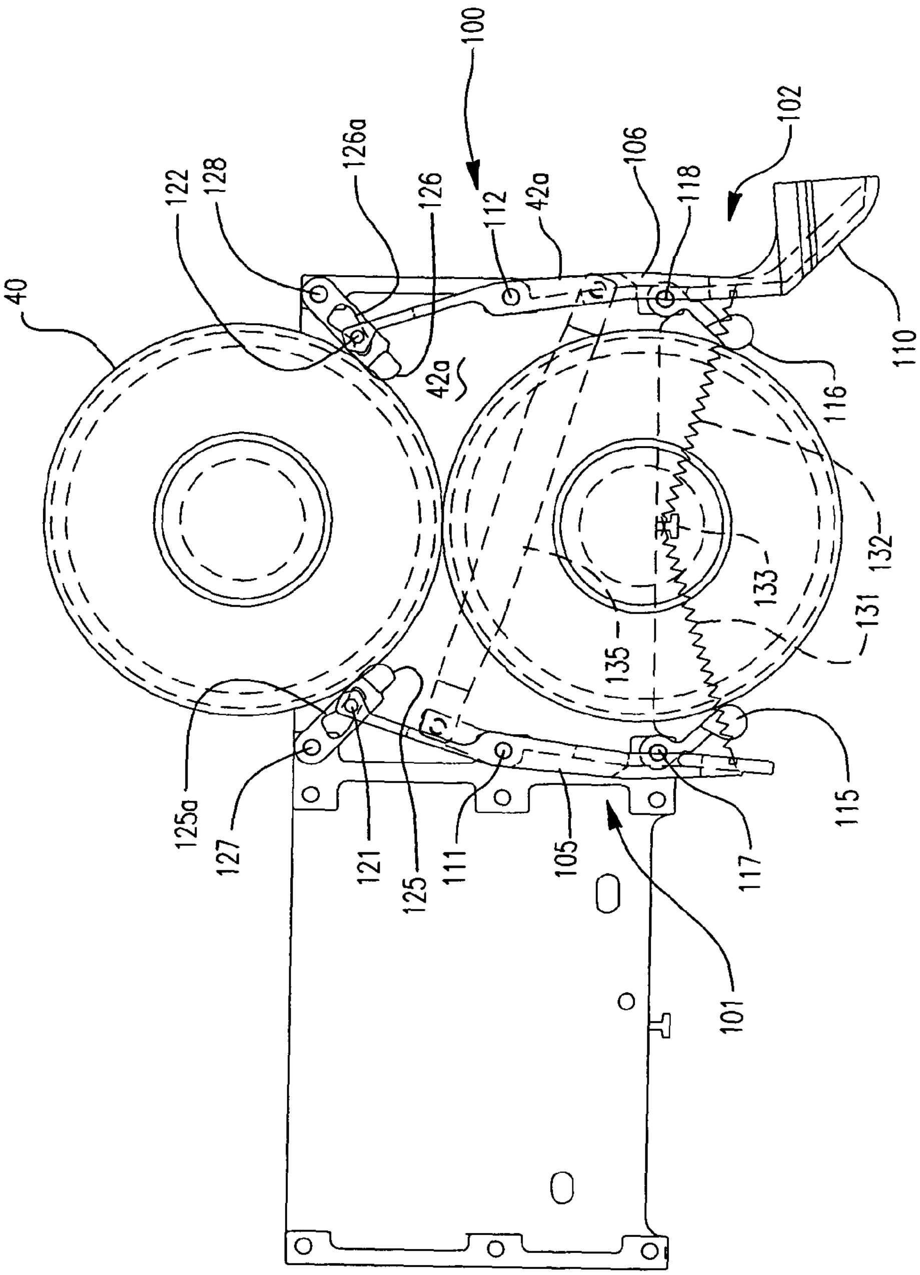
FIG. 9 is a top view of the container release assembly of FIG. 5, illustrating the container release assembly in a fifth position less partially retaining the first beverage bottle than in the fourth position, and retaining the second beverage bottle.
Figure 10:
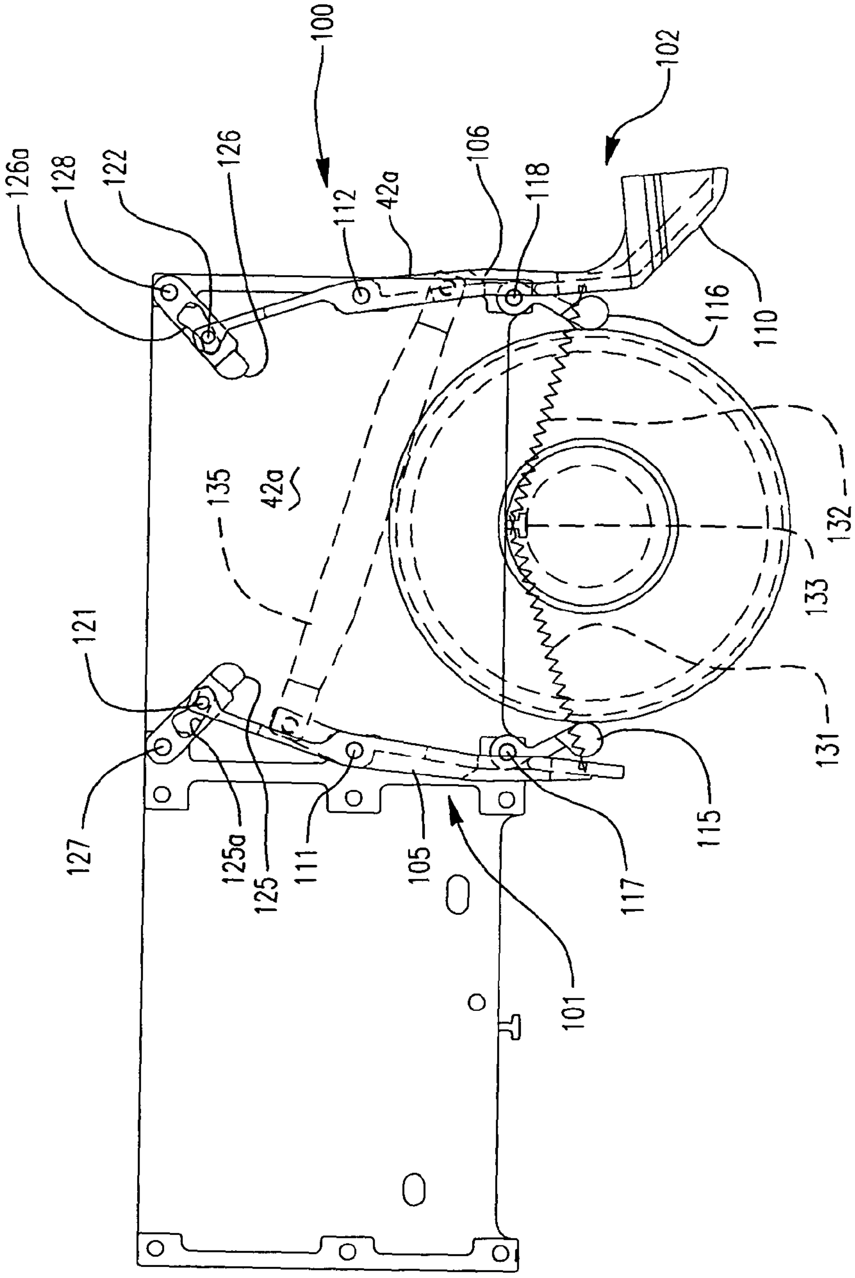
FIG. 10 is a top view of the container release assembly of FIG. 5, illustrating the container release assembly in a sixth position releasing the first beverage bottle.

As rotation continues, from about 88.0 to about 96.0 degrees (FIGS. 8 through 10), gates 105, 106 continue to rotate counter clockwise and clockwise, respectively, to increase the distance between the front-most portions. The vend queue continues to move forward. Back engaging member 125, 126, however, is held stationary to a curved path, placing it in dwell mode. An angle of about 95.25 degrees between gates 105, 106 and a line perpendicular to tray 42, as seen in FIG. 9, provides a distance of 2.598 inches between front engaging members 115, 116 and a distance of 2.120 inches between back engaging members 125, 126.

Figure 11:
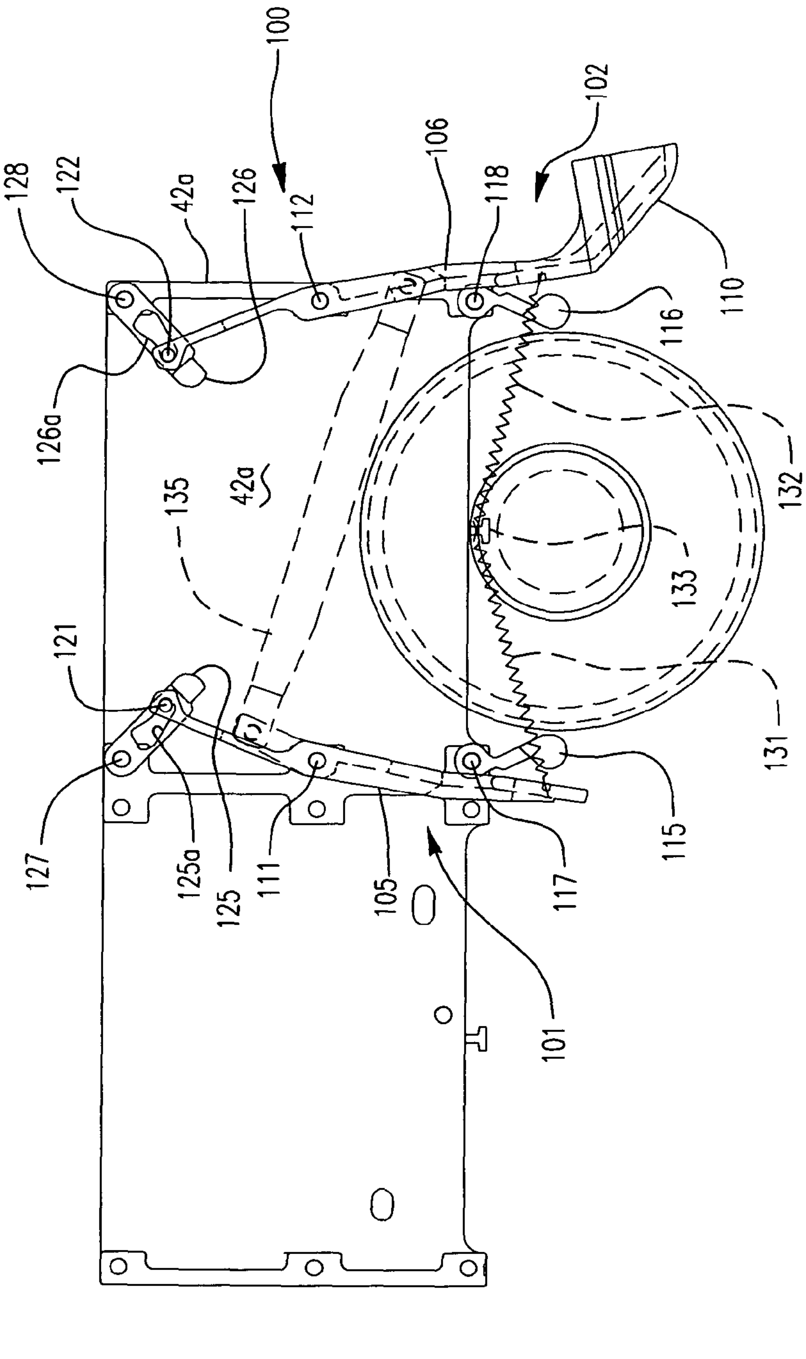
FIG. 11 is a top view of the container release assembly of FIG. 5, illustrating the container release assembly in a seventh position having released the first beverage bottle.
Figure 12:
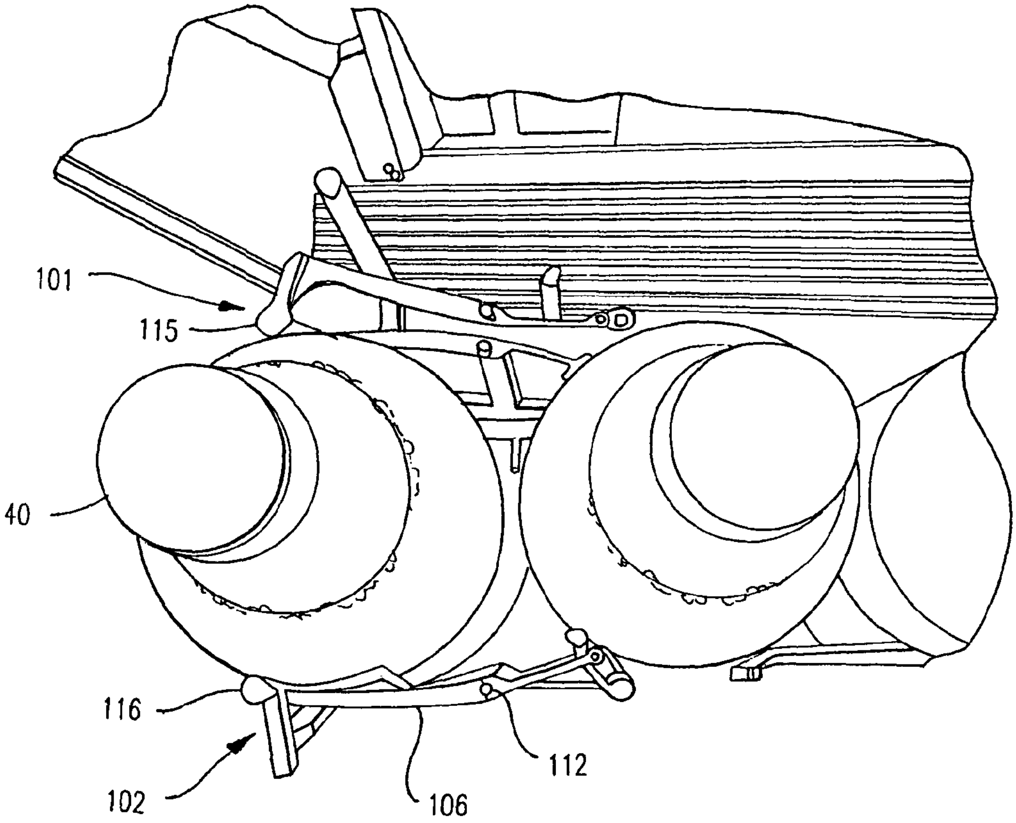
FIG. 12 is a detailed top view of the container release assembly of FIG. 4, illustrated in the position of FIG. 8 retaining both the first beverage bottle and the second beverage bottle.
Figure 13:
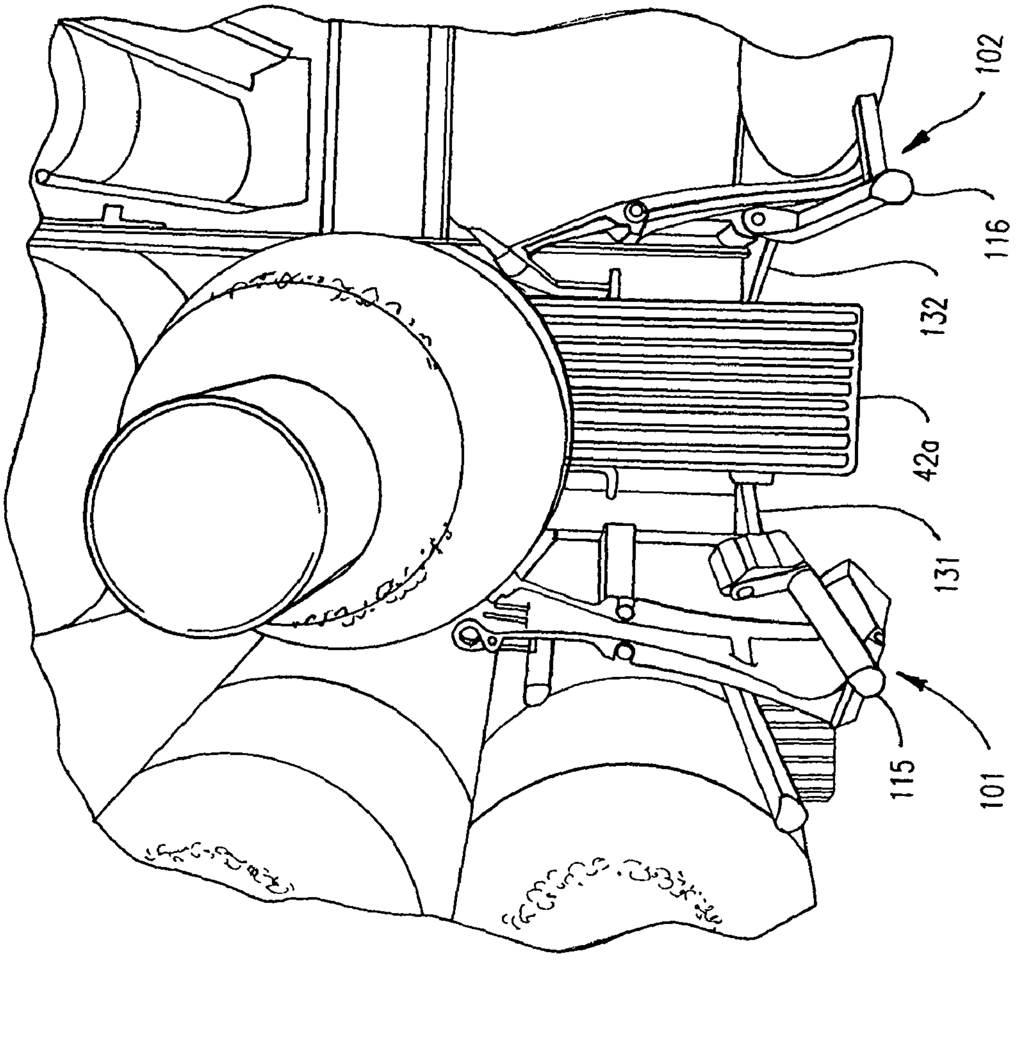
FIG. 13 is a detailed top view of the container release assembly of FIG. 4, generally in the position of FIG. 9, with the first container released and retaining the second bottle.
Figure 14:
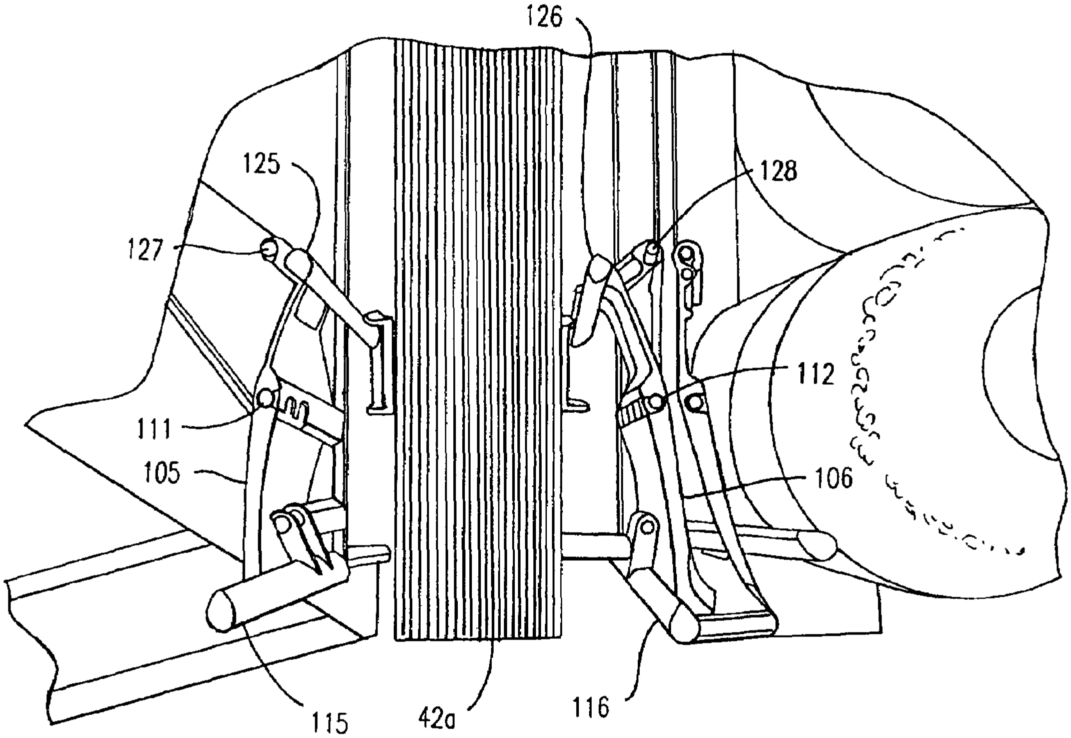
FIG. 14 is a detailed top view of the container release assembly as shown in FIG. 11, but with no bottle remaining in the vend queue.
Figure 15:
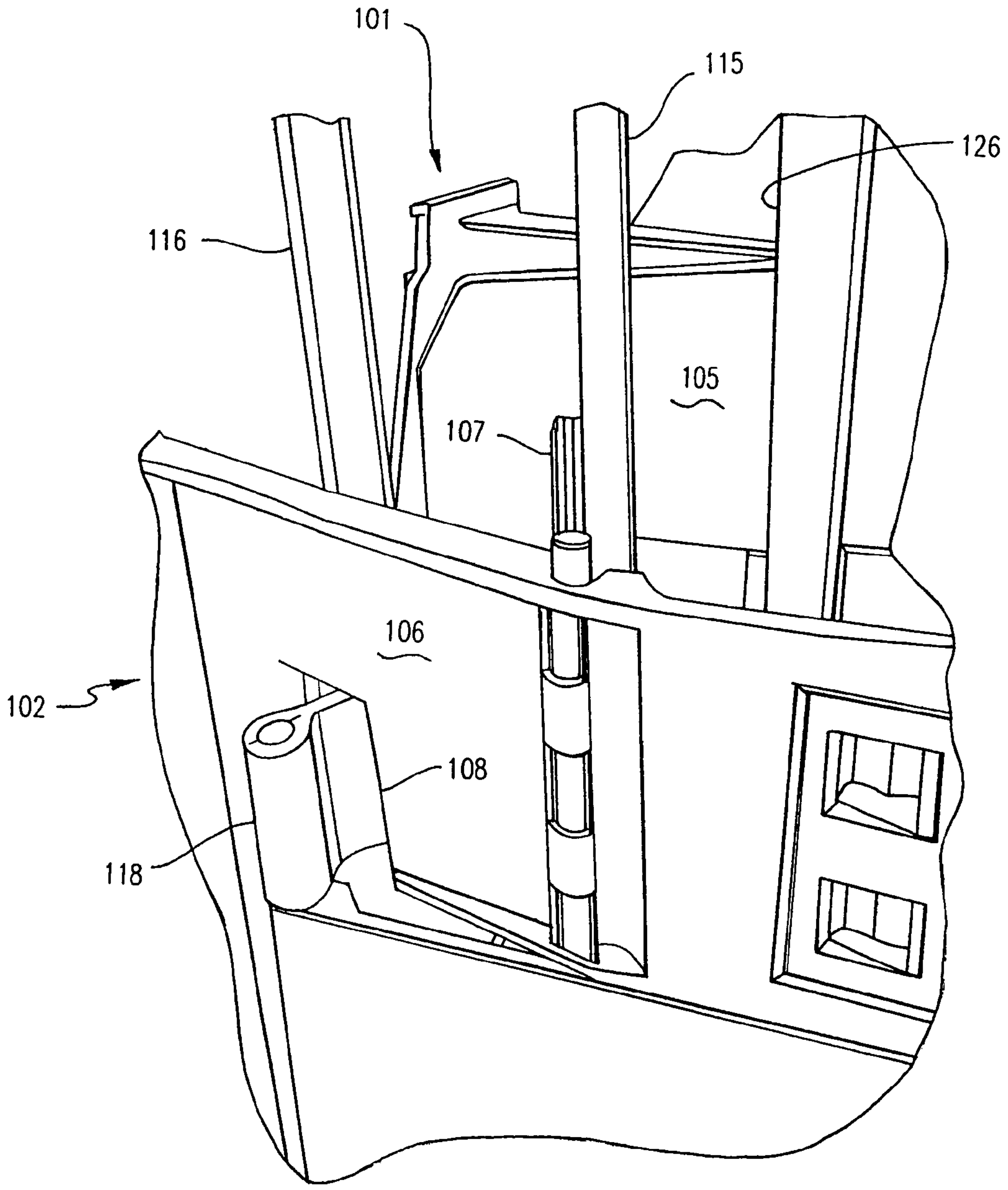
FIG. 15 is an enlarged, perspective view of a portion of the container release assembly of FIG. 4.
Figure 16:
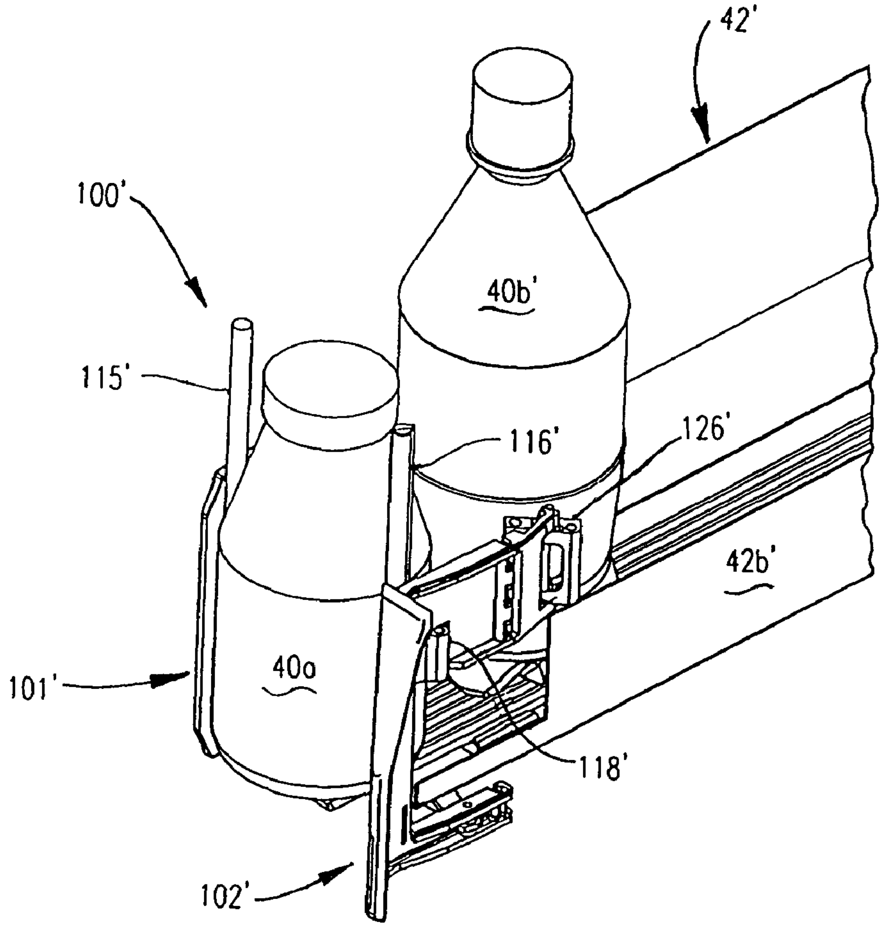
FIG. 16 is a perspective view of a second embodiment of a container release assembly according to the present invention, the container release assembly illustrated with a vend queue having two different types of beverage bottles.
Figure 17:
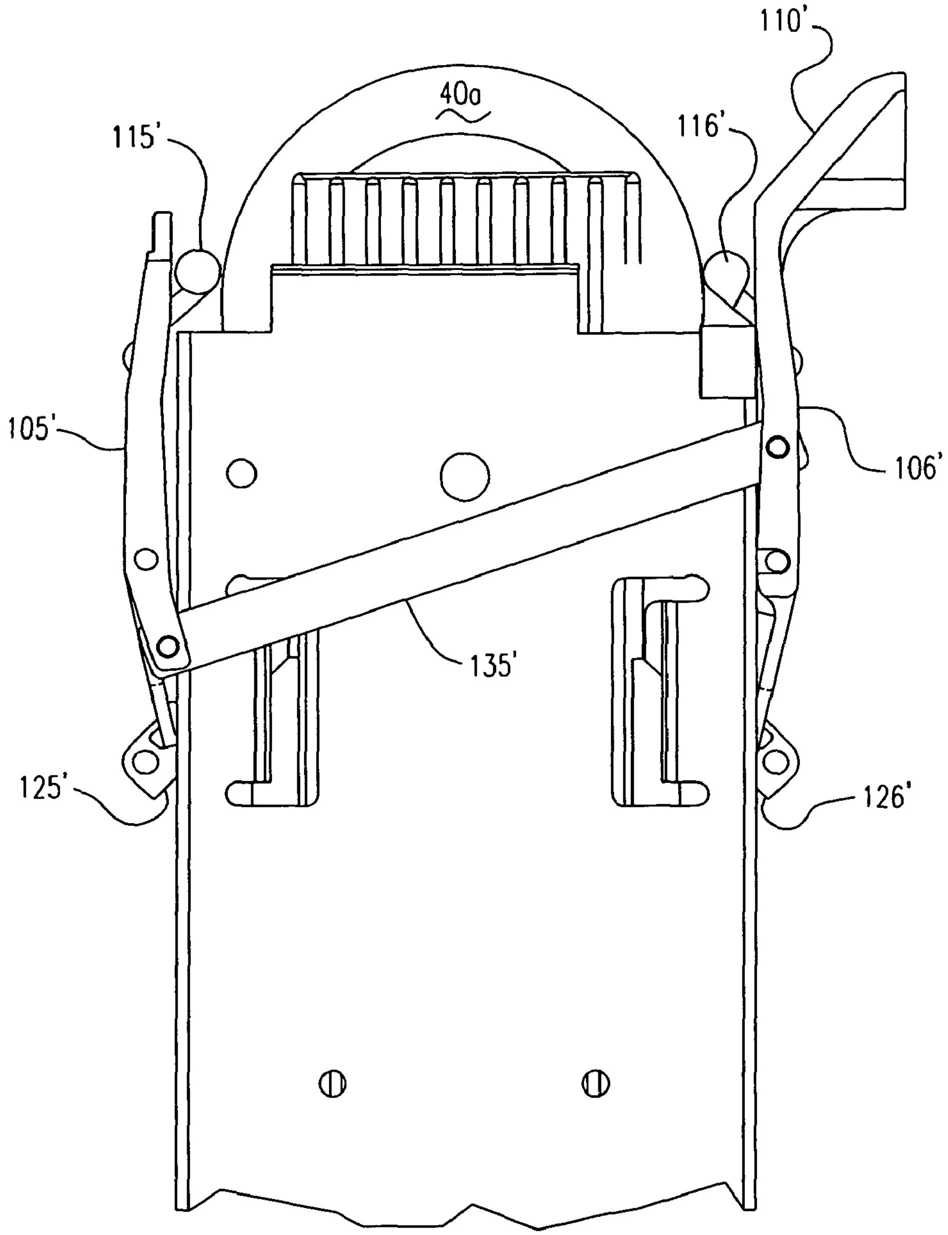
FIG. 17 is a bottom view of the container release assembly of FIG. 16.
Figure 18:
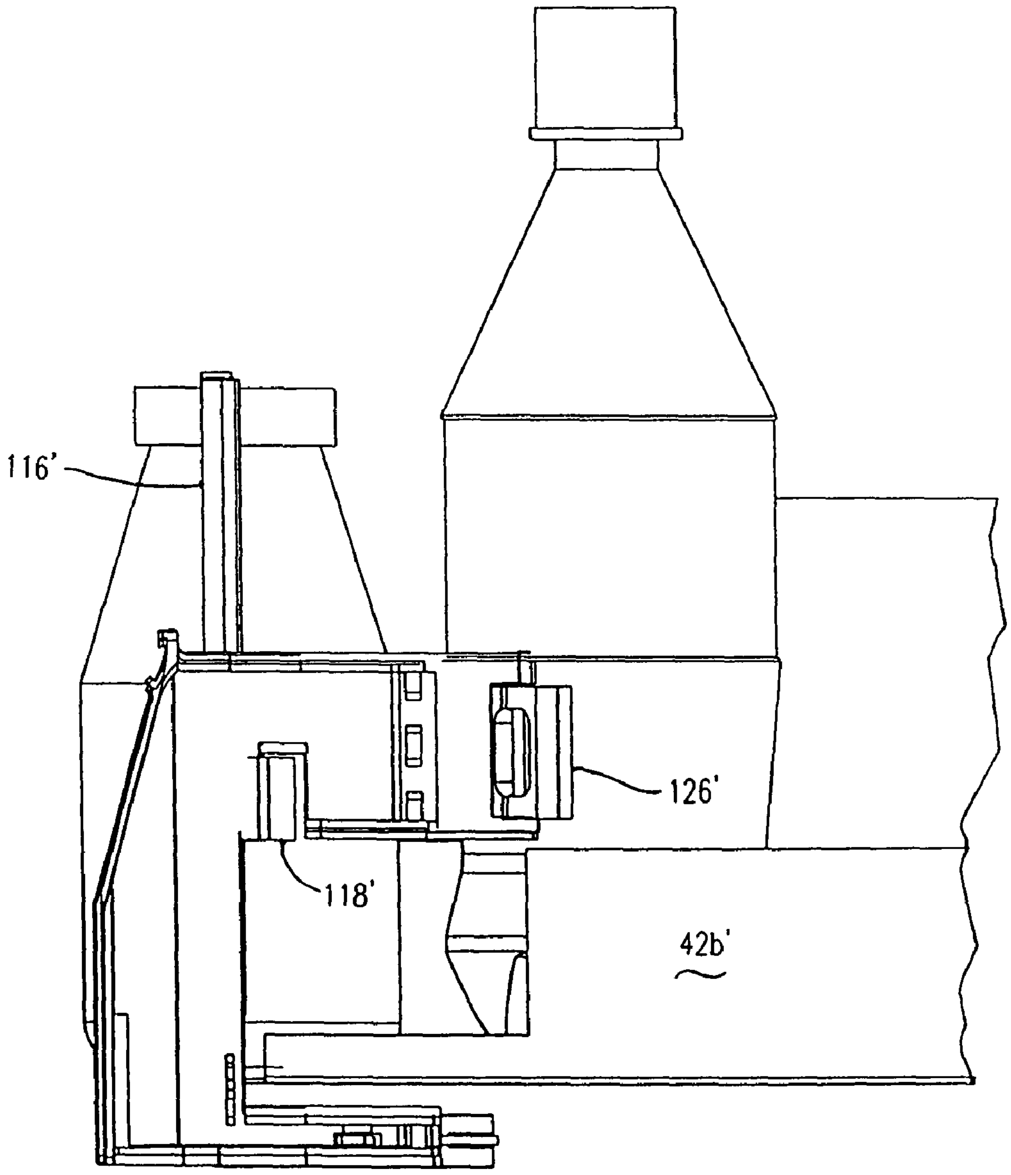
FIG. 18 is a side view of the container release assembly of FIG. 16.

Further motion of gates 105, 106, to about 96.0 to 99.5 degrees, allows accommodation of beverage containers with larger diameters (e.g., 3 inches and more). In FIG. 11, where an angle of 99.5 degrees is illustrated, front engaging members 115, 116 have a distance of 3.205 inches therebetween and back engaging members 125, 126 have a distance of 2.159 inches therebetween.

The above-described motion of assembly 100 is actuated when an external activating force, in a Z-direction toward the open face of tray 42 towards its back, is applied to foremost portion 110 of gate 106. A robotic container capture device, as described above and in U.S. Pat. Nos. 6,230,930, 6,328,180 and 6,513,677, can provide the actuation force. Such an actuation force causes gate 105, 106 to pivot (gate 105 in a clockwise direction as viewed from above and gate 106 in a counterclockwise direction) about hinge pin 111, 112 against the bias of springs 131, 132. Such pivotal action causes the back engaging member 125, 126 to rotate in counterclockwise and clockwise direction, respectively, about hinge 127, 128, thus moving the back engaging member 125, 126 into the advancing path of a second-in-line advancing beverage container. As gate 105, 106 rotates about hinge pin 111, 112, the forward portion of gate 105, 106 will "slide" outward as viewed from the front or top of assembly 100, until gate 105, 106 is in resting engagement against sidewall 42*b*. As such sliding motion occurs, slot 107, 108, will no longer retard pivotal movement of front engaging member 115, 116, and engaging member 115, 116 will pivot, as a result of forces applied to it by the first-in-line beverage container pushed against engaging member 115, 116, in a clockwise and counterclockwise direction, respectively, as viewed from above, about hinge 117, 118, until engaging member 115, 116 rests generally parallel to and alongside gate 105, 106. At that position, the first-in-line beverage container can freely slide by gravity out of the open end of tray 42. At the same time, the back engaging member 125, 126 prevents sliding motion of the second-in-line container, and all containers behind it, down tray 42.

Referring now particularly to FIGS. 16 through 19, a similar, second container release assembly of the present invention is generally illustrated at 100'. Where appropriate, features of assembly 100' similar to those features of assembly 100, described above, are designated with the same reference number with a prime notation (i.e., "'").

Container release assembly 100' includes a first container release apparatus 101' and a second container release apparatus 102'. When viewed from the point of view of the vending machine customer, first container release apparatus 101' is on the left side of the vend queue and second container release apparatus 102' is on the right side of the vend queue. Each apparatus 101', 102' respectively includes a gate 105', 106', a front container stop or engaging member 115', 116', and a back container stop or engaging member 125', 126'. Gate 105', 106' is pivotally connected to tray 42' particularly to the sidewalls, at hinge 111', 112'. Gate 106' includes a foremost portion 110', which will be described below. A link 135', positioned below floor 42*a*' of tray 42', extends between and operably connects the two release apparatus 101', 102'. Specifically, link 135' connects gate 105' to gate 106' and provides symmetrical but rotationally opposite movement between gate 105' and gate 106'.

Each gate 105', 106' includes a slot formed therein; this slot allows a portion of front engaging member 115', 116' to extend through gate 105', 106' and pivotally connect to sidewall 42*b*' by a hinge 117', 118'. Back engaging member 125', 126' is also pivotally connected to sidewall 42*b*', by a hinge pin 127', 128'.

Figure 19:
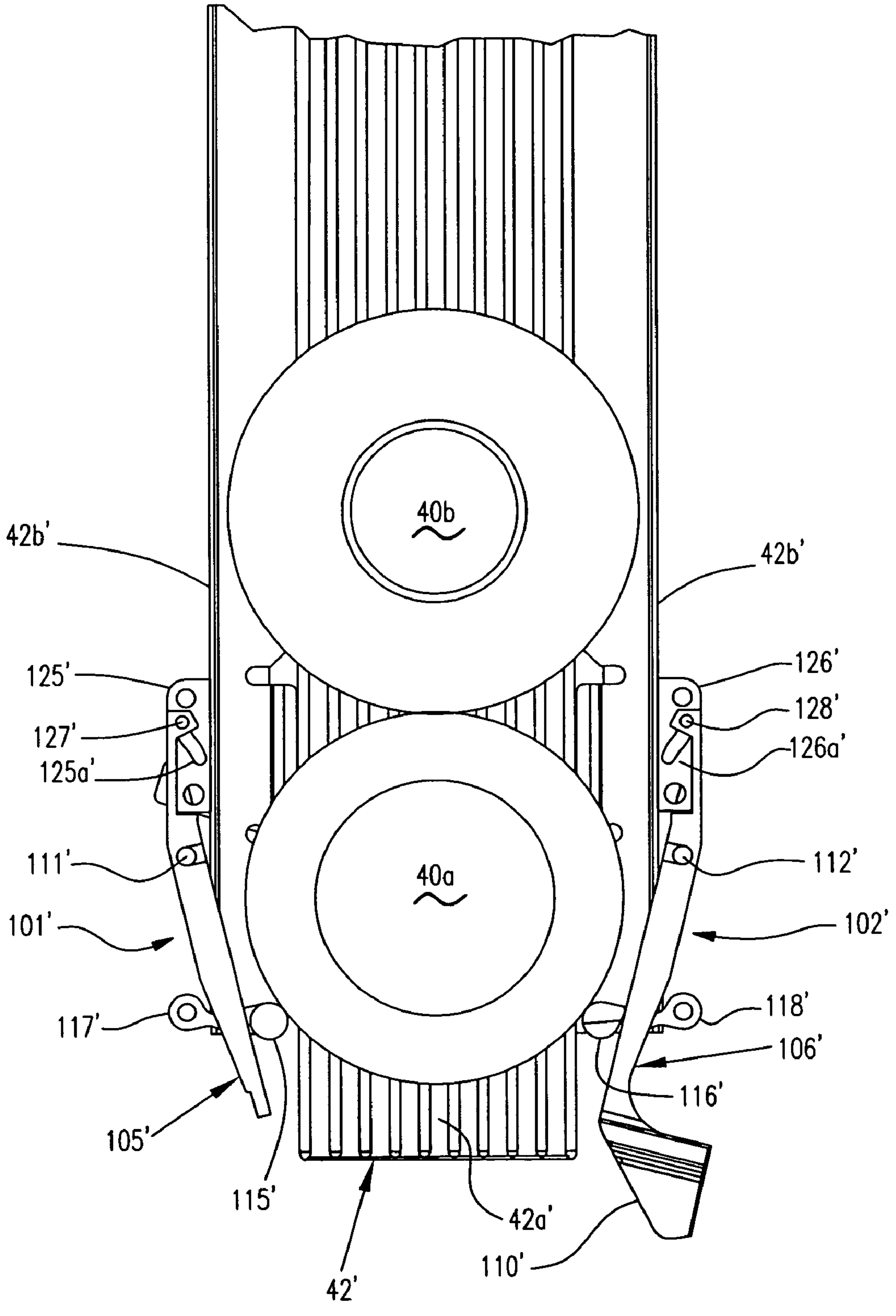
FIG. 19 is a top view of the container release assembly of FIG. 16, illustrating the container release assembly in a first position retaining a first beverage bottle and with a second beverage bottle in the vend queue.

In its "home" position, shown in FIG. 19, gate 105', 106' is positioned with the front-most portion, that is, the portion forward of hinge 111', 112' where front engaging member 115', 116' is present, positioned closer to the center of tray 42' than hinge 111', 112'. The back-most portion of gate 105', 106', that is, the portion back of hinge 111', 112' where back engaging member 125', 126' is present, is positioned farther from the center of tray 42' than hinge 111', 112'. As container release assembly 100' is activated, gate 105', 106' pivots about hinge 111', 112', causing the front-most portion of gate 105', 106' to move outward toward sidewall 42*b*' and the back-most portion of gate 105', 106' to move inward toward the center of tray 42'.

In this embodiment, gate 105', 106' is bent in the proximity of hinge 111', 112', that is gate 105', 106' is angled. The front-most portions of gate 105', 106' form a pair of forward cam surfaces, and gate 106' further includes foremost portion 110'. Gate 105', 106' retainably holds front engaging member 115', 116', which is extends generally vertically and generally perpendicular to floor 42*a*' and generally parallel to side walls 42*b*' of tray 42'. The height of engaging member 115', 116' can vary to accommodate different heights of beverage containers. Back engaging member 125', 126' includes slot 125*a*', 126*a*' therein which pivotally and moveably retains pin 127', 128', which is fixed to gate 105', 106'. In this embodiment, back engaging member 125', 126' does not extend above the level of gate 105', 106'.

Same as for the first embodiment, the connection of back engaging member 125', 126' with gate 105', 106' is such that a fast-acting cam is provided; the "fast-acting" being faster than that at front engaging member 115', 116'. Such fast action allows back engaging member 125', 126' to restrain the second-in-line container prior to the release of the first-in-line container by front engaging member 115', 116'. Slot 125*a'*, 126*a'* in engaging member 125', 126' is strategically positioned and shaped relative to hinge pin 127', 128' such that when gate 105', 106' is pivoted about hinge 111', 112', back engaging member 125', 126' pivots toward the center of tray 42' faster and farther than front engaging member 115', 116' pivots out from the center of tray 42'.

Figure 20:
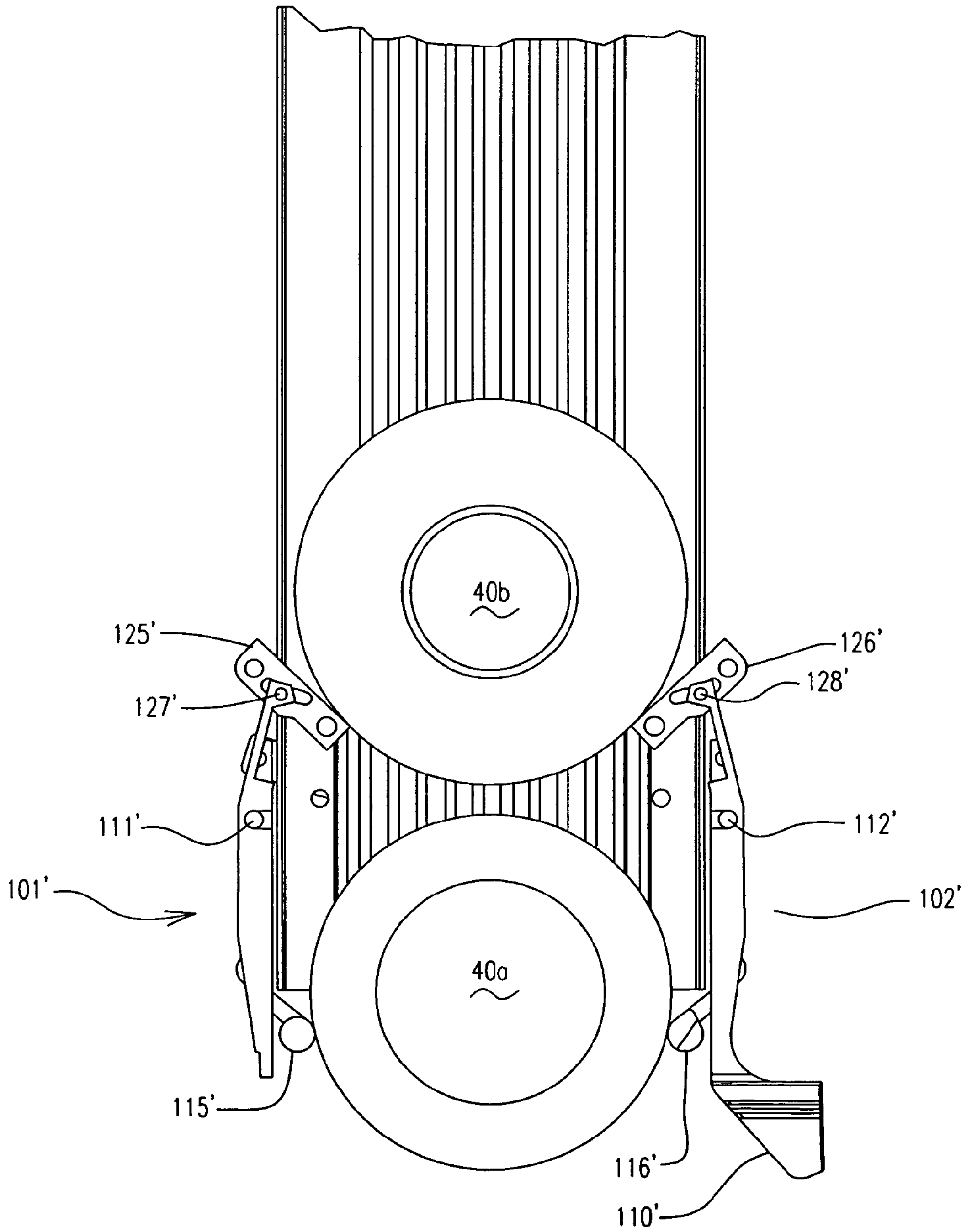
FIG. 20 is a top view of the container release assembly of FIG. 16, illustrating the container release assembly in a second position partially retaining the first beverage bottle and retaining the second beverage bottle.
Figure 21:
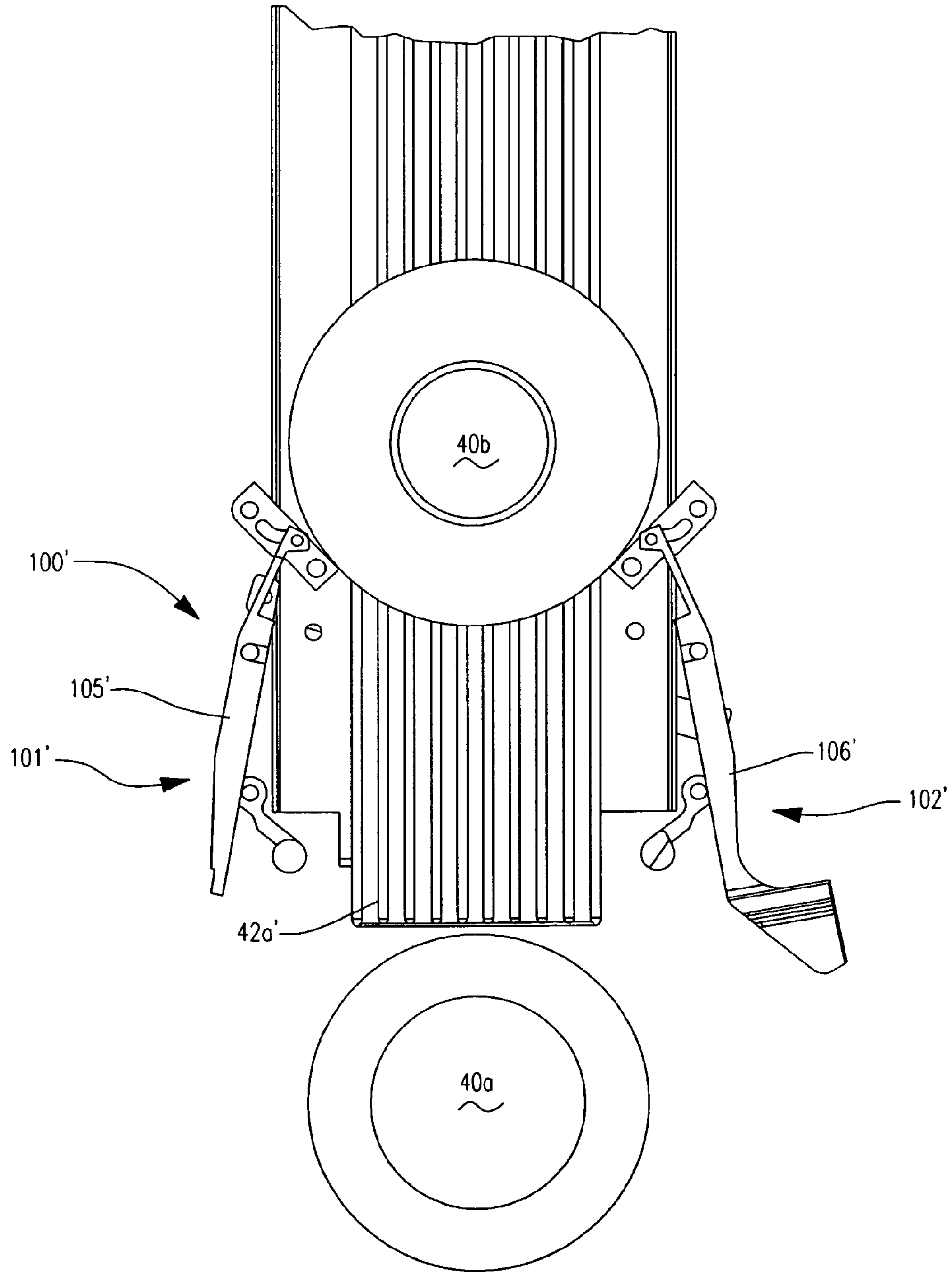
FIG. 21 is a top view of the container release assembly of FIG. 16, illustrating the container release assembly in a third position having released the first beverage bottle and retaining the second beverage bottle.

The movement of container release assembly 100' is illustrated in FIGS. 19 through 21. In FIG. 19, container release assembly 100' is in a first, "home" position retaining a first beverage bottle 40*a* and with a second beverage bottle 40*b* in the vend queue. In this home position, gates 105', 106' are angled in toward the center of tray 42' and front engaging members 115', 116' contact and retain bottle 40*a*, which is completely positioned on tray bottom 42*a'*. In FIG. 20, gate 105', 106' has pivoted on hinge 111', 112' so that gate 105', 106' is essentially parallel with sidewall 42*b'*. Engaging members 115', 116', still retaining bottle 40*a*, have allowed bottle 40*a* to progress along tray bottom 42*a'* so that only a portion of bottle 40*a* is supported by bottom 42*a'*. Each back engaging member 125', 126' has pivoted about pin 127', 128' and now engages second bottle 40*b*. In FIG. 21, container release assembly 100' has released the first beverage bottle 40*a* by gates 105', 106' pivoting farther about hinge 111', 112' and extending outward of sidewall 42*b'* so that engaging members 115', 116' do not contact bottle 40*a*. Second bottle 40*b* is retained by back engaging members 125', 126'.

In the preferred embodiments, the container release assemblies 100, 100' described are constructed of a die-cast aluminum and are secured t and positioned at the vending ends of the product holding trays 42. Other materials, such as other metals, polymeric materials (such as polycarbonate and polyvinyl chloride (PVC)), ceramic materials and composite materials can also be used. Manufacturing processes can include die-casting, machining, injection molding, reaction-injection-molding, laser machining, and the like. The material selection will depend upon the space available for the container release assemblies 100, 100' and upon the desired rigidity and movement tolerances required in order for the release assemblies 100, 100' to perform properly and reliably. The material selected should allow for minimal torsional flex of the assemblies 100, 100'. In particular, the material selection should insure that the pivot axis of hinge pins 11, 112 of gates 105, 106 remain operably parallel during operation; that the gates 105, 106 or other mechanisms that move the engagement members 115, 116, 125, 126 have sufficient rigidity to maintain the required operative movement tolerances of the engagement members. The assembly should be sufficiently rigid in both the front to back and side to side directions.

The rigidity of the assembly, due to the material used and the design of the assembly, is preferably to such a level that the gates 105, 106 and engagement members 115, 116, 125, 126 do not flex or otherwise fluctuate from the designed or engineered specifications more than 10%, preferably 5%. The tolerances of the assembly should be within 10%, preferably 5% of the engineered specifications.

The primary functions of vending machines are well-known in the art and will not be detailed herein, since they do not form a part of the invention. It is well within the province of one skilled in the art to configure a vending machine in the proper format configuration and under proper control for which it is intended to serve. Accordingly, it is not believed necessary to further belabor such generalities in this application.

It is seen from FIGS. 19 through 21 that bottle 40*a* has a smaller diameter than bottle 40*b*. Container release assembly 100, 100' can be used to vend, from the same vend queue, bottles or other containers having different dimensions, particularly, different diameters. It will be appreciated that assembly 100, 100' of the present invention allows for greater flexibility in arranging products of varied sizes, shapes, volumes and types of containers within the same queue of the vending machine. It will also be appreciated that implementation of the principles of the invention can be achieved in an economical manner since none of the product trays or shelves require any additional spacers or other accessories for modifying the width of the tray. These and other features and advantages of the invention will be readily apparent to those skilled in the art in view of the foregoing description.

It will be appreciated that while a preferred embodiment description and application of the invention have been disclosed, other modifications of the invention not specifically disclosed or referred to herein will be apparent to those skilled in the art in light of the foregoing description. This description is intended to provide concrete examples of a preferred embodiment structure and application clearly disclosing the present invention and its operative principles. Accordingly, the invention is not limited to any particular embodiment or configuration or component parts thereof.

What is claimed:

1. A container release assembly for use with a vending machine for vending items from a queue, the assembly comprising:

(a) a first release apparatus having a first front engaging member and a first rear engaging member, each of the first front engaging member and the first rear engaging member pivotally positioned in relation to a first gate, the first release apparatus positioned on a first side of the item to be vended;

(b) a second release apparatus having a second front engaging member and a second rear engaging member, each of the second front engaging member and the second rear engaging member pivotally positioned in relation to a second gate, the second release apparatus positioned on a second side, opposite the first side, of the item to be vended;

(c) the first release apparatus and the second release apparatus being operably and pivotally connected together; and (d) the first and second front engaging members being operative to engage a first item in the queue, and the first and second rear engaging members being operative to engage a second item in the queue.

2. The assembly according to claim 1, wherein:

(a) the first from engaging member is pivotally connected to the first gate by a first camming mechanism, (b) the first rear engaging member is pivotally connected to the first gate by a first fast camming mechanism, the first fast camming mechanism having a faster camming motion that the first camming mechanism;

(c) the second front engaging member is pivotally connected to the second gate by a second camming mechanism; and (d) the second rear engaging member is pivotally connected to the second gate by a second fast camming mechanism, the second fast camming mechanism having a faster camming motion that the second camming mechanism.

3. The assembly according to claim 2 wherein the first and second fast camming mechanisms comprise a bifurcated feature.

4. The assembly according to claim 3, wherein the bifurcated feature is a kidney shaped slot formed in the first and second gates.

5. The assembly according to claim 1 wherein:

(a) the first gate is pivotally connected to a first sidewall between the first front engaging member and the first rear engaging member; and (b) the second gate is pivotally connected to a second sidewall between the second front engaging member and the second rear engaging member.

6. The assembly according to claim 1 wherein:

(a) a portion of the first front engaging member extends through a slot in the first gate and is pivotally connected to a first sidewall of the assembly; and (b) a portion of the second front engaging member extends through a slot in the second gate and is pivotally connected to a second sidewall of the assembly.

7. The assembly according to claim 1 wherein each of the first front engaging member, second front engaging member, first rear engaging member and second rear engaging member comprises a vertical portion extending generally perpendicular to a floor of the assembly.

8. The assembly according to claim 1, wherein the assembly is configured to vend the first item in the queue having a first diameter and the second item in the queue having a second diameter, the second diameter being different than the first diameter.

9. The assembly according to claim 1, wherein the assembly is configured to vend beverage containers.

10. A vend item release apparatus configured for operative mounting adjacent a dispensing end of a vending machine tray configured to retainably bold a plurality of vend items in a generally horizontal ordered queue of such items, the release apparatus comprising:

(a) a front pair of item retainers configured to engage a first vend item of the queue;

(b) a rear pair of item retainers configured to engage a second vend item of the queue, the second vend item positioned in the queue adjacent to the first vend item;

(c) a plurality of actuators cooperatively interconnecting the front pair of item retainers with the rear pair of item retainers, the actuators including cam members configured to alternately cause the front pair of item retainers to release the first vend item while the rear item retainers block dispensing movement of the second vend item, and to then cause the rear pair of item retainers to allow passage of the second vend item in a dispensing direction toward the front pair of item retainers which simultaneously move to engage and block dispensing movement of the second vend item, wherein the cam members cause the rear pair of item retainers to move toward and away from each other at a relatively faster rate than the front pair of item retainers move.

11. The apparatus according to claim 10, wherein the first vend item has a first diameter and the second vend item has a second diameter, the second diameter being different than the first diameter.

12. The apparatus according to claim 10, wherein the first vend item has a first shape and the second vend item has a second shape, the second shape being different than the first shape.

13. The apparatus according to claim 10, wherein the release apparatus is configured to cause movement and controlled dispensing of the first and second vend items from the queue of such items by guiding the vend items along an axis toward the dispensing end of the vending machine tray.

14. The apparatus according to claim 10 wherein the release apparatus includes a stabilizer operably connected with the front and rear item retainers for maintaining the movement tolerances of the item retainers within 10% of their engineered specifications.

* * * * *

UNITED STATES PATENT AND TRADEMARK OFFICE

CERTIFICATE OF CORRECTION

PATENT NO. : 6,966,455 B2
DATED : November 22, 2005
INVENTOR(S) : Skavnak

It is certified that error appears in the above-identified patent and that said Letters Patent is hereby corrected as shown below:

Column 12,
Line 15, “prime notation (i.e, """").” should read -- (i.e., " ' "). --.

Column 13,
Line 34, “are secured t and positioned” should read -- are secured and positioned --.
Line 49, “pins 11, 112 of gates” should read -- pins 111, 112 of gates --.

Column 15,
Line 38, “retainably bold a plurality” should read -- retainably hold a plurality --.

Signed and Sealed this

Ninth Day of May, 2006

JON W. DUDAS
*Director of the United States Patent and Trademark Office*